(12) United States Patent
Landgraf

(10) Patent No.: US 12,155,185 B2
(45) Date of Patent: Nov. 26, 2024

(54) BULLWHEEL TENSIONER SYSTEMS AND DEVICES

(71) Applicant: Sherman + Reilly, Inc., Chattanooga, TN (US)

(72) Inventor: Daniel Landgraf, Chattanooga, TN (US)

(73) Assignee: Sherman + Reilly, Inc., Chattanooga, TN (US)

( * ) Notice: Subject to any disclaimer, the term of this patent is extended or adjusted under 35 U.S.C. 154(b) by 359 days.

(21) Appl. No.: 17/701,923

(22) Filed: Mar. 23, 2022

(65) Prior Publication Data

US 2022/0311225 A1 Sep. 29, 2022

Related U.S. Application Data

(60) Provisional application No. 63/165,679, filed on Mar. 24, 2021.

(51) Int. Cl.
*H02G 1/04* (2006.01)
*B65H 59/18* (2006.01)
*H02G 1/08* (2006.01)

(52) U.S. Cl.
CPC ............... *H02G 1/04* (2013.01); *B65H 59/18* (2013.01); *H02G 1/081* (2013.01)

(58) Field of Classification Search
CPC . B65H 59/18; B66D 1/36; H02G 1/04; H02G 1/081

(Continued)

(56) References Cited

U.S. PATENT DOCUMENTS 2,947,494 A * 8/1960 Merritt .................. B65H 59/16
                                                                            242/155 BW
2,954,702 A * 10/1960 Petersen .............. B66D 1/7405
                                                                            242/155 BW (Continued)

FOREIGN PATENT DOCUMENTS

CN         107954358 A * 4/2018 ............... B66D 1/36

OTHER PUBLICATIONS

Sauber—Model 1510-B Reel Trailer, accessed via https://saubermfg.com/trailer/model-1510-b-reel-trailer/ (Mar. 23, 2021).

*Primary Examiner* — Sang K Kim
*Assistant Examiner* — Nathaniel L Adams
(74) *Attorney, Agent, or Firm* — Troutman Pepper Hamilton Sanders LLP; Ryan A. Schneider; Korbin M. Blunck

(57) ABSTRACT

The disclosed technology includes a bullwheel assembly having a wheel configured to rotate about a central axis extending through a center of the wheel and a central hub assembly attached to the wheel proximate the center of the wheel. The central hub assembly can facilitate rotation of the wheel about the central axis. A shaft can be in mechanical communication with the central hub assembly and configured to support the central hub assembly, a bullwheel support frame in mechanical communication with the shaft and configured to support the shaft, and a plurality of removeable liners attached to the wheel and disposed along an outer circumferential surface of the wheel. Each removeable liner of the plurality of removeable liners can have a groove formed therein. The groove can be configured to receive and support various sizes of electrical utility lines.

20 Claims, 17 Drawing Sheets

(58) Field of Classification Search
USPC .................................................. 242/155 BW
See application file for complete search history.

(56) References Cited

U.S. PATENT DOCUMENTS

| | | | | |
|---|---|---|---|---|
| 3,054,572 | A * | 9/1962 | Williams | H02G 1/04 |
| | | | | 242/155 BW |
| 3,439,883 | A * | 4/1969 | Petersen | H02G 1/04 |
| | | | | 242/155 BW |
| 3,884,040 | A * | 5/1975 | Green | F15B 7/08 |
| | | | | 74/89.14 |
| 3,941,324 | A * | 3/1976 | Green | H02G 1/06 |
| | | | | 242/155 BW |
| 4,343,443 | A * | 8/1982 | Grounds | B65H 59/16 |
| | | | | 242/155 BW |
| 5,139,751 | A * | 8/1992 | Mansfield | B65H 51/10 |
| | | | | 137/355.2 |
| 5,228,656 | A | 7/1993 | Sauber | |
| 6,419,179 | B1 * | 7/2002 | Ho | B66D 1/36 |
| | | | | 242/396.5 |

* cited by examiner

Section A-A

DETAIL VIEW

Section B-B

DETAIL VIEW

Section C-C

*Section C-C*

DETAIL VIEW**

Section D-D

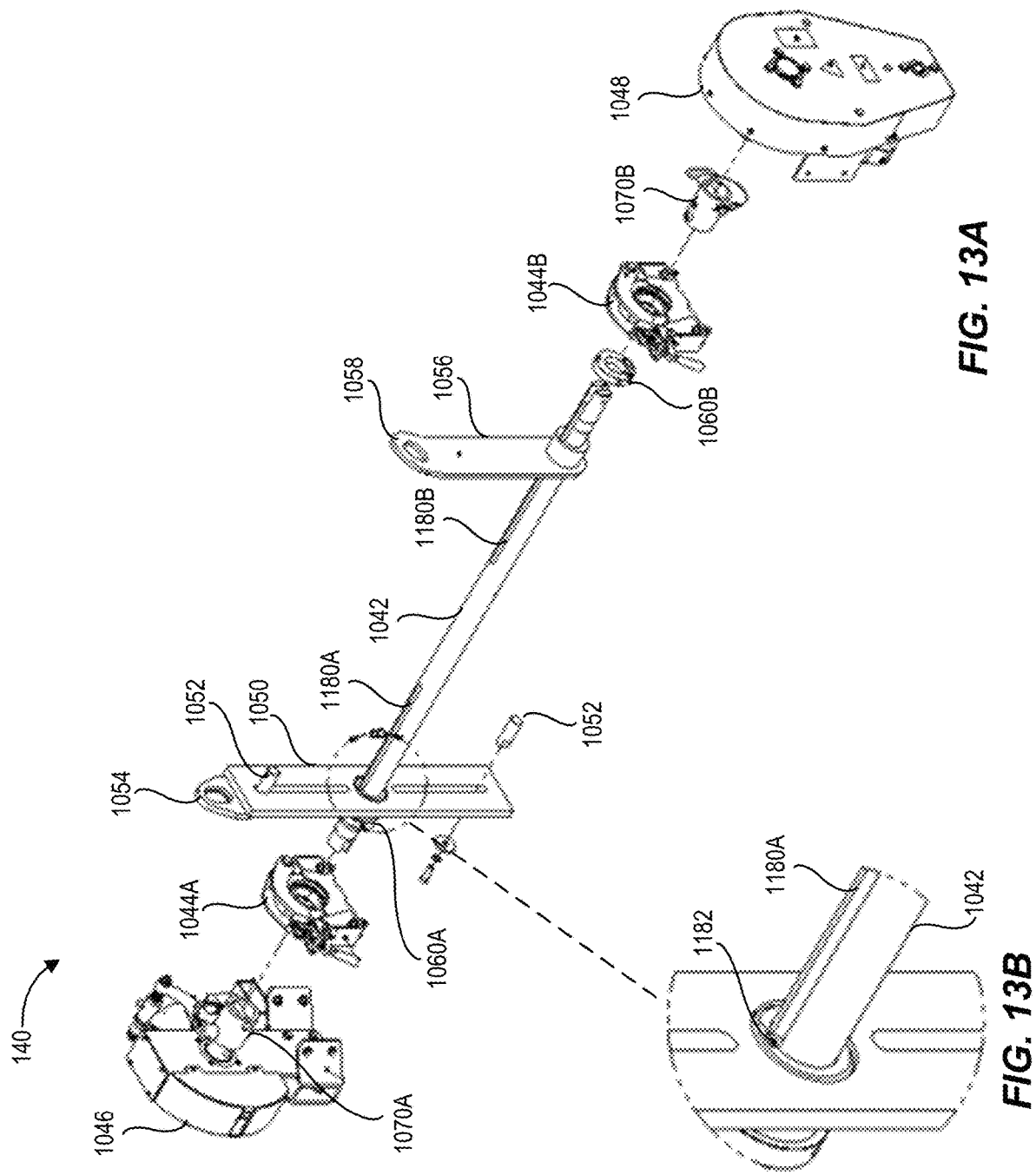

BULLWHEEL TENSIONER SYSTEMS AND DEVICES

CROSS-REFERENCE TO RELATED APPLICATIONS

This application claims benefit under 35 USC § 119(e) of U.S. Provisional Patent Application No. 63/165,679 filed 24 Mar. 2021, the entirety of which is incorporated herein by reference as if set forth herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The disclosed technology relates generally to systems and devices used for pulling and tensioning lines; and, more specifically, to systems and devices for pulling and tensioning lines used in the electrical utility industry.

2. Description of Related Art

Line pulling equipment is a vital tool in the electrical utility industry. Such equipment can be used to manipulate wires, ropes, cables, and other materials (collectively, "lines") during installation (e.g., installing new utility lines) and/or reconductoring (e.g., pulling a new conductor through an old utility line). Typically, line pulling equipment can include a puller machine located at one end of a stretch of utility line and a tensioner machine located at the opposite end of the stretch of the utility line. When installing or reconductoring a stretch of utility line, the puller typically pulls the line through sets of sheaves (often referred to as "pulleys" or "blocks") that are attached to power poles while the tensioner controls a tension applied to the line as it is fed from a spool. In certain examples, utility lines can extend for long distances, greatly increasing the forces and stresses on the line pulling equipment.

There are several problems with existing line pulling equipment which, under the large forces and stresses exerted on the line pulling equipment, can pose a severe risk to an operator and/or other user of the line pulling equipment. Additionally, existing designs can be somewhat cumbersome and require significant time to setup, adjust, and use. For example, the bullwheels used on many tensioning machines include grooves that are designed for specific gauges of lines (i.e., lines having a specific outer diameter). Switching the bullwheel, or a bullwheel liner, with a bullwheel that is properly sized for the line being installed can be a difficult process that requires a significant amount of time. Consequently, it is not uncommon for operators of bullwheel tensioners to use improperly-sized bullwheels which can damage the bullwheel, the line, or both. As will be appreciated, the energy stored in lines under tension suddenly being released due to a damaged line failure can cause severe injury to those in the immediate area as the line whips back toward the bullwheel tensioner. Accordingly, there is a need in the art for improved bullwheel designs that can increase the ease of use and protect cables of various sizes from damage.

Another drawback of existing bullwheel tensioners is that the spool from which the line is pulled can sometimes be off-center with a fairlead that guides the line onto the bullwheels. When this occurs, the configuration can cause the line to "slap" or jump as it is unwound from the spool. A jumping or slapping line can damage the line and potentially cause injury to nearby operators. Accordingly, there is a need in the art for improved bullwheel tensioner systems that can reduce or eliminate the "slap" or "jump" exhibited by existing bullwheel designs.

All of the aforementioned problems increase risks when operating line pulling equipment. The intense stresses and forces can break lines and equipment and can damage surrounding structures and injure workers. These and other problems are addressed by examples of the technology disclosed herein.

SUMMARY

Examples of the present disclosure can include a bullwheel assembly for a bullwheel tensioner system. The bullwheel assembly can include a wheel that is configured to rotate about a central axis extending through a center of the wheel and a central hub assembly attached to the wheel proximate the center of the wheel. The central hub assembly can be configured to facilitate rotation of the wheel about the central axis. The bullwheel assembly can include a shaft that is in mechanical communication with the central hub assembly and configured to support the central hub assembly, a bullwheel support frame in mechanical communication with the shaft and configured to support the shaft, and a plurality of removeable liners attached to the wheel and disposed along an outer circumferential surface of the wheel. Each removeable liner of the plurality of removeable liners can have a groove formed therein. The groove can be configured to receive and support a first electrical utility line having an outer diameter of approximately 0.5 inches and a second electrical utility line having an outer diameter of approximately 1.2 inches.

The groove can include a bottom surface and two sidewalls extending outwardly from the bottom surface to form the groove. The bottom surface can have a radius that is sized to receive the first electrical utility line. The two sidewalls can extend outwardly from the bottom surface at a predetermined flare angle such that the groove can be configured to receive the second electrical utility line. The radius can be approximately 0.6 inches and the predetermined flare angle is approximately 12 degrees.

The central hub assembly can include a plurality of tapered bearings that are configured to facilitate rotation of the wheel about the central axis. The shaft can include a tapered end that can conform to an angle formed by the tapered bearings.

The bullwheel assembly can include a disc brake attached to the central hub and a brake caliper attached to the bullwheel support frame. The brake caliper can be configured to apply a force to the disc brake to control a rotation of the wheel. The disc brake and brake caliper can be disposed at least partially within a recess formed in a side of the wheel.

The disclosed technology can include a bullwheel tensioner system having a chassis, a reel carrier assembly attached to the chassis and configured to support a reel having an electrical utility line disposed thereon, a fairlead assembly attached to the chassis and configured to receive the electrical utility line, and a bullwheel assembly.

The bullwheel assembly can include a wheel that is configured to rotate about a central axis extending through a center of the wheel and a central hub assembly attached to the wheel proximate the center of the wheel. The central hub assembly can be configured to facilitate rotation of the wheel about the central axis. The bullwheel assembly can include a shaft that is in mechanical communication with the central hub assembly and configured to support the central hub assembly, a bullwheel support frame in mechanical communication with the shaft and configured to support the shaft, and a plurality of removeable liners attached to the wheel and disposed along an outer circumferential surface of the wheel. Each removeable liner of the plurality of removeable liners can have a groove formed therein. The groove can be configured to receive and support a first electrical utility line having an outer diameter of approximately 0.5 inches and a second electrical utility line having an outer diameter of approximately 1.2 inches.

The groove can include a bottom surface and two sidewalls extending outwardly from the bottom surface to form the groove. The bottom surface can have a radius that is sized to receive the first electrical utility line. The two sidewalls can extend outwardly from the bottom surface at a predetermined flare angle such that the groove can be configured to receive the second electrical utility line. The radius can be approximately 0.6 inches and the predetermined flare angle is approximately 12 degrees.

The central hub assembly can include a plurality of tapered bearings that are configured to facilitate rotation of the wheel about the central axis. The shaft can include a tapered end that can conform to an angle formed by the tapered bearings.

The bullwheel assembly can include a disc brake attached to the central hub and a brake caliper attached to the bullwheel support frame. The brake caliper can be configured to apply a force to the disc brake to control a rotation of the wheel. The disc brake and brake caliper can be disposed at least partially within a recess formed in a side of the wheel.

The disclosed technology can include a bullwheel tensioner system having a chassis, a reel carrier assembly attached to the chassis and configured to support a reel having an electrical utility line disposed thereon, a fairlead assembly attached to the chassis and configured to receive the electrical utility line, and a bullwheel assembly.

The reel carrier assembly can include a reel carrier frame and a shaft supported by the reel carrier frame. The shaft can have a slot formed therein. The reel carrier assembly can include a drive bar that is slidably attached to the shaft. The drive bar can have a key that is configured to extend into the slot formed in the shaft and a clamp that is slidably attached to the shaft. The clamp can be configured to couple to the shaft such that the clamp prevents a reel supported by the shaft from sliding axially along the shaft.

The clamp can be configured to transition between a secured configuration and an unsecured configuration to facilitate centering of the reel on the shaft. When in the secured configuration, the clamp can prevent the reel from sliding axially along the shaft. When the clamp is in the unsecured configuration, the clamp can permit the reel to slide axially along the shaft.

The fairlead assembly can include a fairlead assembly frame, a first horizontal roller attached to the fairlead assembly frame and disposed proximate a top of the fairlead assembly frame, a second horizontal roller attached to the fairlead assembly frame and disposed proximate a bottom of the fairlead assembly frame, a first vertical roller attached to the fairlead assembly frame and disposed proximate a side of the fairlead assembly frame, and a second vertical roller slidably attached to the fairlead assembly frame. The second vertical roller can be adjustable between a first position and a second position.

The fairlead assembly can include a slot that extends through the fairlead assembly frame and an adjustable fastener extending through the slot and the second vertical roller. The adjustable fastener can be configured to prevent the second vertical roller from sliding along a length of the slot when the adjustable fastener is in a secured configuration. The adjustable fastener can be configured to permit the second vertical roller to slide along the length of the slot between the first position and the second position when the adjustable fastener is in an unsecured configuration.

When the second vertical roller is in the first position, the fairlead assembly can form a first gap formed between the first vertical roller and the second vertical roller. When the second vertical roller is in the second position, the fairlead assembly can form a second gap formed between the first vertical roller and the second vertical roller. The second gap can be greater than the first gap. The first gap can be approximately 1.8 inches and the second gap can be approximately 3.3 inches.

DESCRIPTION OF THE DRAWINGS

FIG. 13A is an exploded view of a reel carrier assembly of a bullwheel tensioner system, in accordance with some examples of the present disclosure.

FIG. 13B is a detail view of a portion of the reel carrier assembly shown in FIG. 13A, in accordance with some examples of the present disclosure.

DETAILED DESCRIPTION

Figure 1:
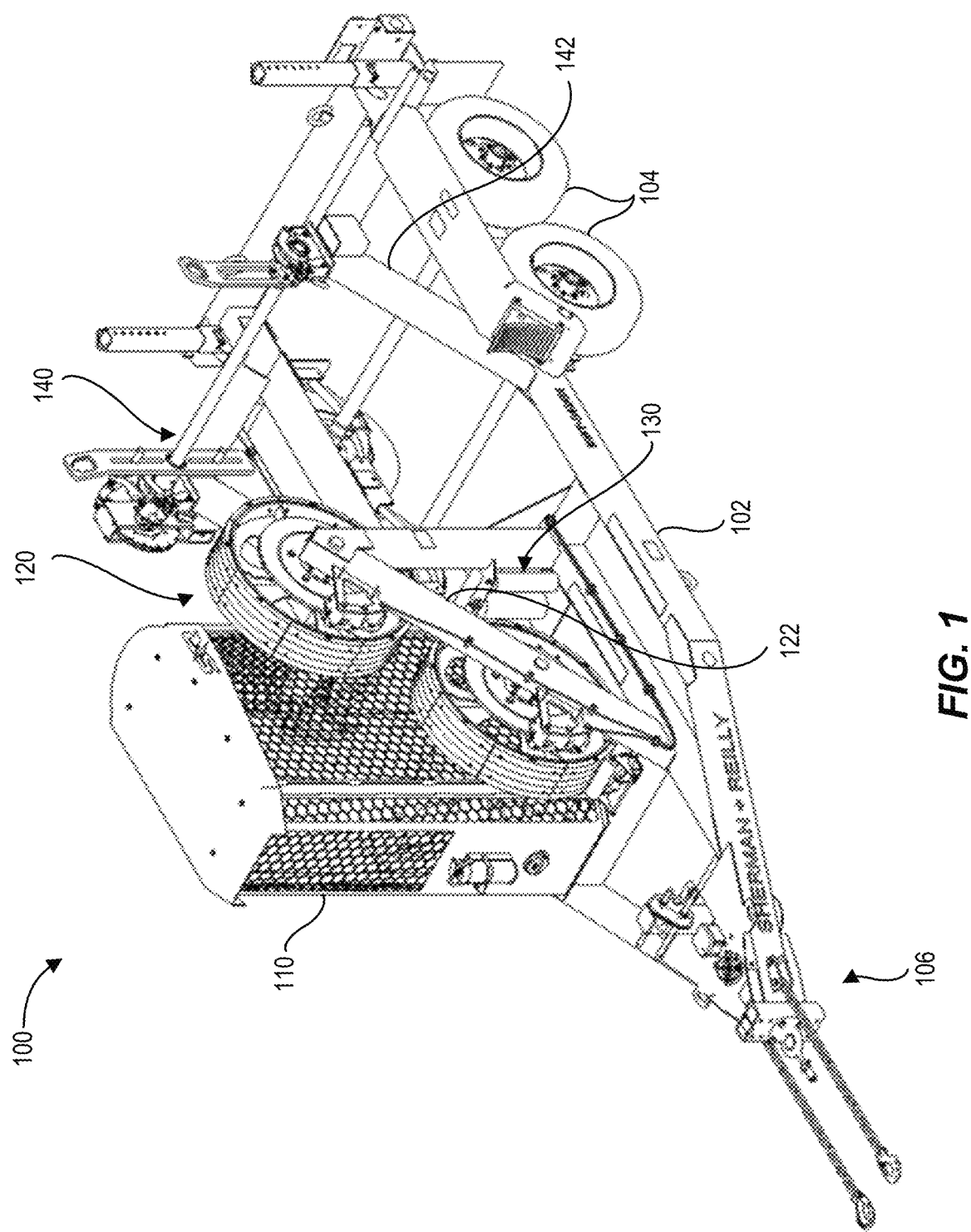
FIG. 1 is a front, perspective view of an example of a bullwheel tensioner system, in accordance with some examples of the present disclosure.

Examples of the present disclosure can include a bullwheel tensioner system having a bullwheel assembly with a removeable liner. The removeable liner can include a groove that is designed to be used to string lines having various diameters. In this way, the disclosed technology can make it easier to string utility lines of various sizes without requiring removeable liner be replaced with liner having a different sized groove. Additionally, the bullwheel assembly can have tapered roller bearings that can reduce a frictional force between the bullwheel and a shaft about which the bullwheel spins, thus requiring less force to rotate the bullwheel.

The bullwheel tensioner system can also include a fairlead assembly that can have multiple rollers configured to direct a line through the fairlead assembly to the bullwheel. The fairlead assembly can include a roller that can be slidably attached to a frame of the fairlead assembly. In this way, the fairlead assembly can be easily adjusted from a first position to a second position. In the first position, the fairlead assembly can have a gap sized permit the line and various components (swivel, coupler, conductor grips, etc.) to pass through the fairlead and in the second position the fairlead assembly can have a gap sized to securely direct the line to the bullwheel.

The bullwheel tensioner system can include a reel carrier assembly that can be configured such that an operator can adjust a position of a reel mounted on the reel carrier assembly so that the reel can be approximately centered with the fairlead assembly. In this way, the reel carrier assembly can prevent damage that can occur as a result of slap, or jumping of the line, that commonly occurs when the line is off-center of the fairlead. The reel carrier assembly can be configured such that the position of the reel can be adjusted without requiring the operator to use any tool, thereby making use of the reel carrier assembly easier and more efficient.

For ease of explanation, the system is discussed below with reference to stringing and supporting power and communications lines. One of skill in the art will recognize, however, that the system is not so limited. Indeed, the system could be used in any number of industries where ropes, support cables (e.g., for ski lifts), communications cables, wires, and other similar products need to be efficiently installed and supported. Thus, the description below is intended to be illustrative and not limiting.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that examples of the disclosed technology may be practiced without these specific details. In other instances, well-known methods, structures, and techniques have not been shown in detail in order not to obscure an understanding of this description.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value. Further, the term "about" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, the term can mean within an order of magnitude, preferably within 2-fold, of a value. Where particular values are described in the application and claims, unless otherwise stated, the term "about" is implicit and in this context means within an acceptable error range for the particular value.

Throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present disclosure as many comparable parameters, sizes, ranges, and/or values may be implemented. The terms "first," "second," and the like, "primary," "secondary," and the like, do not denote an order, quantity, or importance, but rather are used to distinguish one element from another.

It is noted that terms like "specifically," "preferably," "typically," "generally," and "often" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials and/or components described hereinafter as making up the various elements of the present disclosure are intended to be illustrative and not restrictive. Many suitable materials and/or components that would perform the same or a similar function as the materials and/or components described herein are intended to be embraced within the scope of the disclosure. Such other materials and/or components not described herein can include, but are not limited to, materials and/or components that are developed after the time of the development of the disclosure, for example. Any dimensions listed in the various drawings are for illustrative purposes only and are not intended to be limiting. Other dimensions and proportions are contemplated and intended to be included within the scope of the disclosure.

Figure 2:
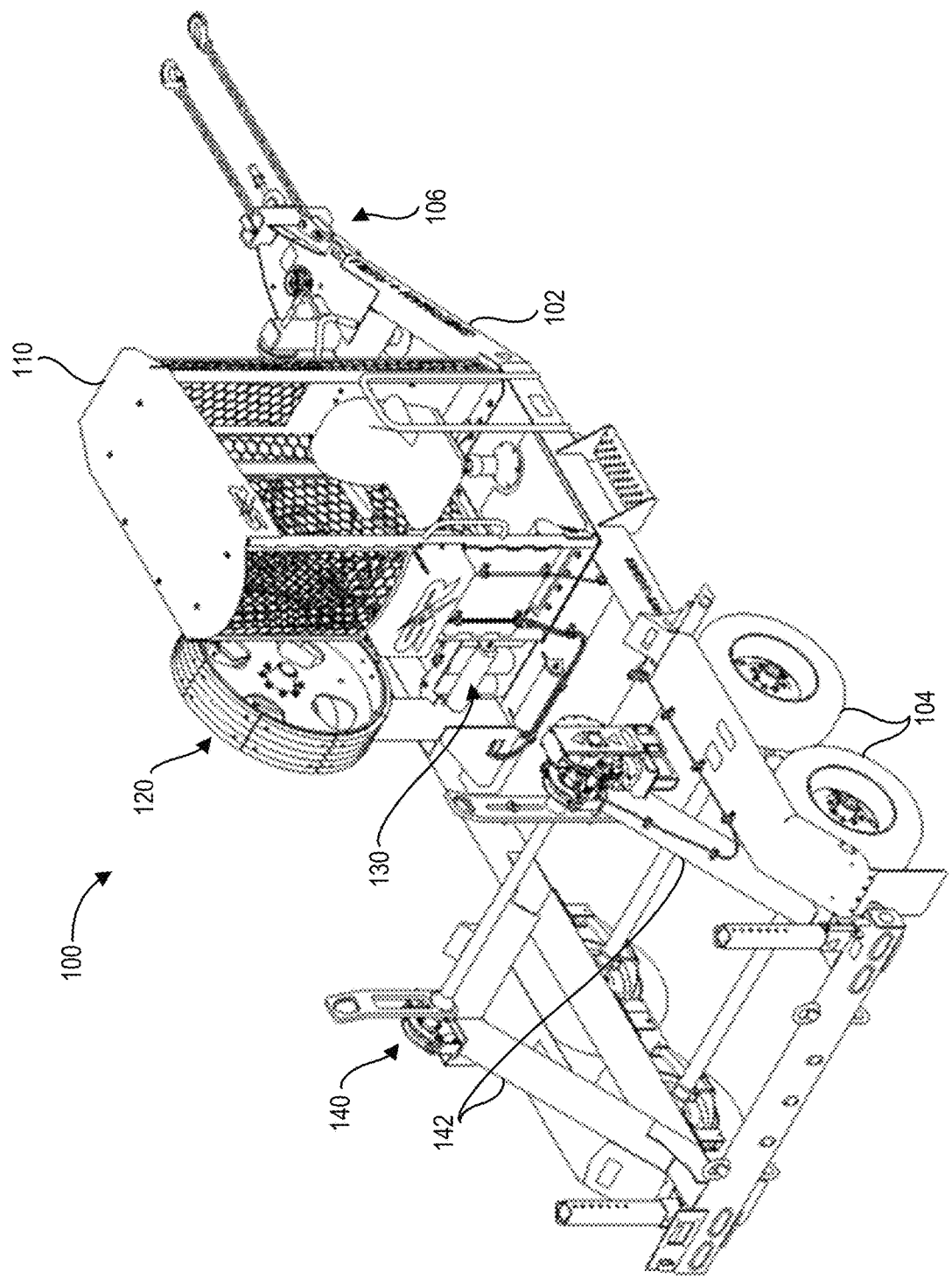
FIG. 2 is a rear, perspective view of an example of a bullwheel tensioner system, in accordance with some examples of the present disclosure.

Turning now to the drawings in which like references represent like elements, FIGS. 1 and 2 illustrate a bullwheel tensioner system 100. The bullwheel tensioner system 100 can include a chassis 102 that can be configured to support an operator station 110, a bullwheel assembly 120, a fairlead assembly 130, and a reel carrier assembly 140. As will become apparent throughout this disclosure, the bullwheel tensioner system 100 can be configured to reduce the threat of damaging a line and to increase the ease of operating the bullwheel tensioner system 100 during installation when compared to existing bullwheel tensioner systems. Throughout this disclosure, several features of the bullwheel tensioner system 100 will be shown and described.

As illustrated in FIGS. 1 and 2, the chassis 102 can include one or more wheels 104 and a trailer attachment feature 106 to facilitate moving the bullwheel tensioner system 100 between various locations. As will be appreciated, however, the chassis 102 illustrated in FIGS. 1 and 2 is offered for illustrative purposes and the chassis 102 can alternatively be mounted on, or integrated with, a vehicle, such as a truck or tractor, to facilitate movement of the bullwheel tensioner system 100 between various locations. As another example, the chassis 102 can be a stand-alone frame without wheels.

As shown, the bullwheel assembly 120 can be mounted nearer a first end of the chassis 102 while the reel carrier assembly 140 can be mounted nearer a second end of the chassis 102. The first end, for example, can be proximate the trailer attachment feature 106 while the second end can be opposite the trailer attachment feature 106. The reel carrier assembly 140 can be positioned approximately above the axles of the wheels 104 so that the weight of the line that is coiled on a reel can be distributed to the wheels. The fairlead assembly 130 can be positioned between the reel carrier assembly 140 and configured to direct a line from the reel carrier assembly 140 to the bullwheel assembly 120.

Figure 3:
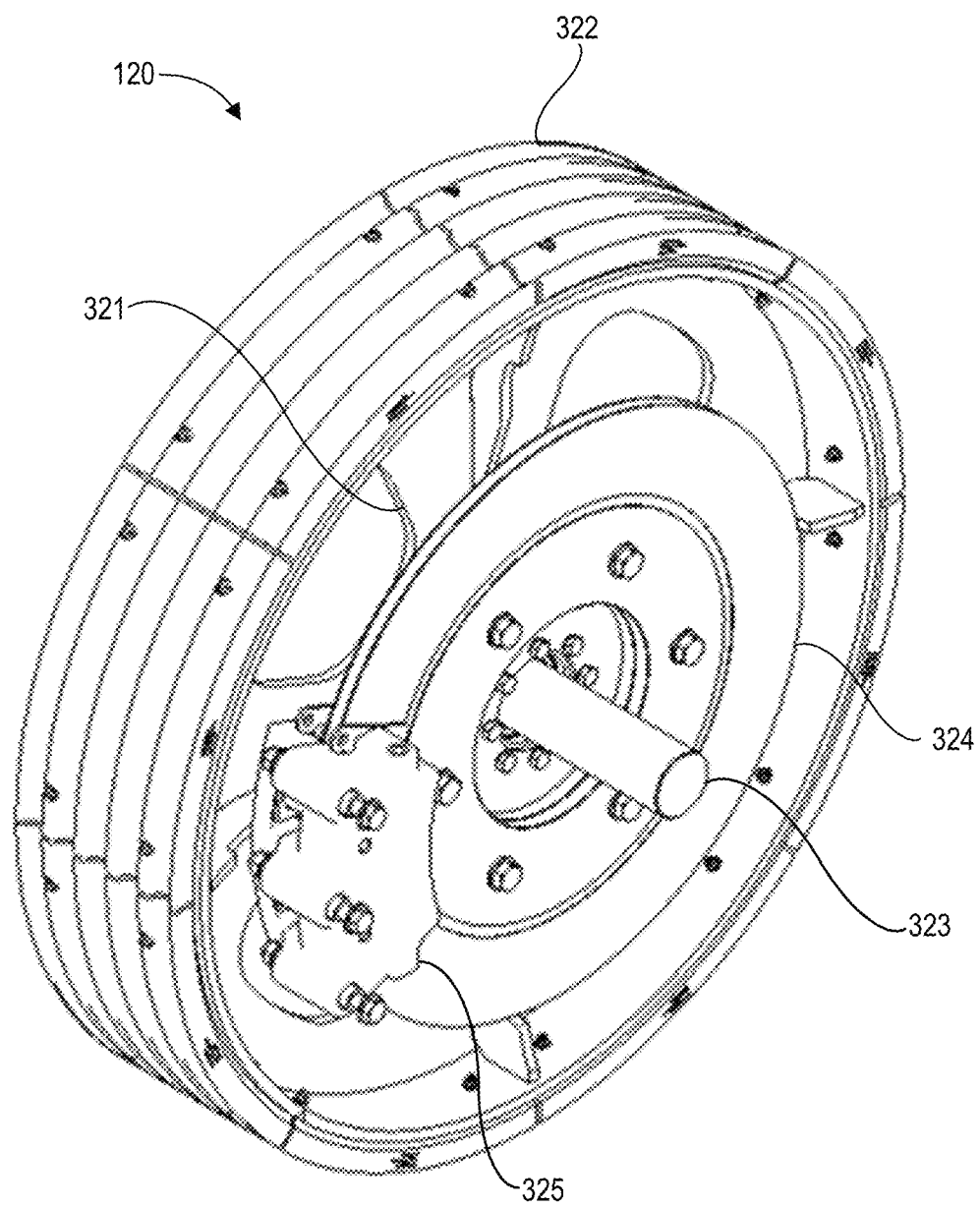
FIG. 3 is a front, perspective view of an example bullwheel assembly of a bullwheel tensioner system, in accordance with some examples of the present disclosure.

Turning now to FIG. 3, the bullwheel assembly 120 can include a wheel 321 having one or more removeable liners 322 attached the wheel 321. The removeable liners 322 can be disposed along an outer circumferential surface of the wheel 321. The bullwheel assembly 120 can include a shaft 323 about which the wheel 321 can turn and a disc brake 324 and brake caliper 325 that can be used to control a rotation of the wheel 321. The shaft 323 can be attached to a bullwheel support frame 122 (as shown in FIG. 1). The bullwheel support frame 122 can be configured to support a single wheel 321 or multiple wheels 321 to form the bullwheel assembly 120.

The wheel 321 can include one or more spokes 421 that can help to reinforce the wheel 321 while also reducing an overall weight of the wheel 321. The bullwheel assembly 120 can include a hub assembly 326 that can be attached to the wheel 321 and disposed between the wheel 321 and a shaft 323. The hub assembly 326 can be configured to facilitate rotation of the wheel 321 about the shaft 323 to permit payout of line during an installation or reconductoring project.

Figure 4:
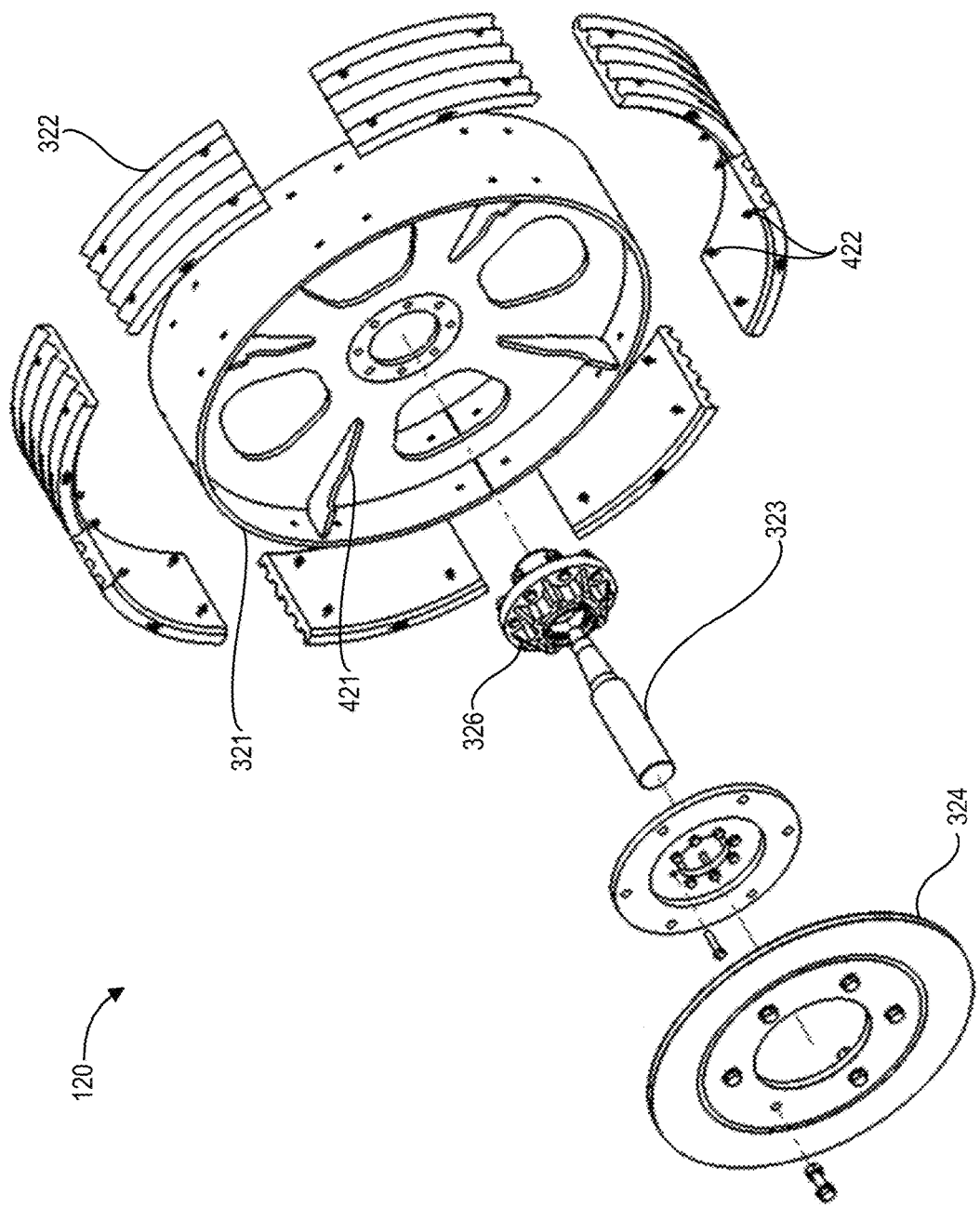
FIG. 4 is an exploded view of a bullwheel assembly of a bullwheel tensioner system, in accordance with some examples of the present disclosure.
Figure 6A:
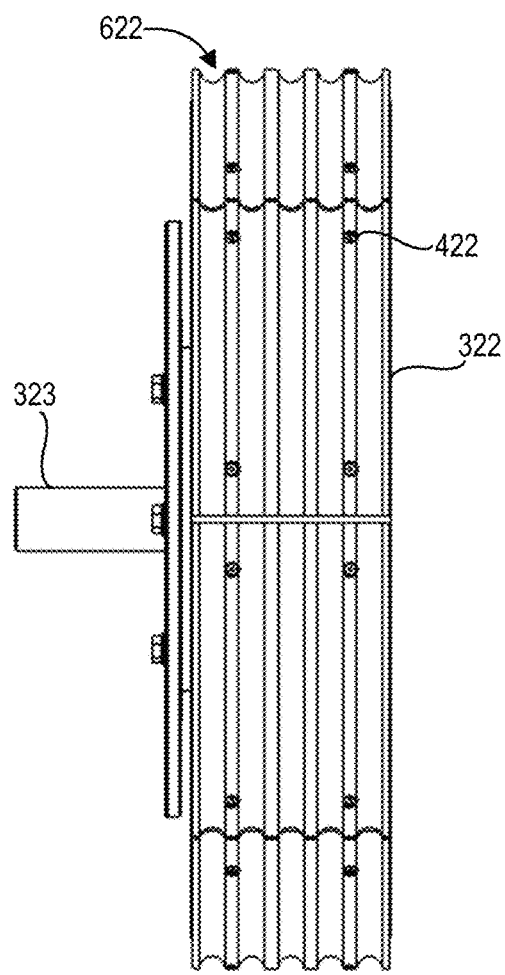
FIG. 6A is a front view of a bullwheel assembly of a bullwheel tensioner system, in accordance with some examples of the present disclosure.

As illustrated in FIG. 4, the removeable liners 322 can include several sections that are configured to abut adjoining sections or be disposed proximate an adjacent section of removeable liner 322 such that the outer circumferential surface of the wheel 321 can be covered with the removeable liners 322. The removeable liners 322 can be individual sections which span a width of the wheel 321 (as illustrated in FIGS. 4 and 6A) and include multiple grooves 622 formed therein that are each configured to receive a line. Alternatively the removeable liners 322 can be individual sections which span only about the width of a single groove 622 (as illustrated in FIG. 6B) and can be attached to the wheel 321 side-by-side such that the multiple removeable liners 322 can collectively span the width of the wheel 321.

Figure 6B:
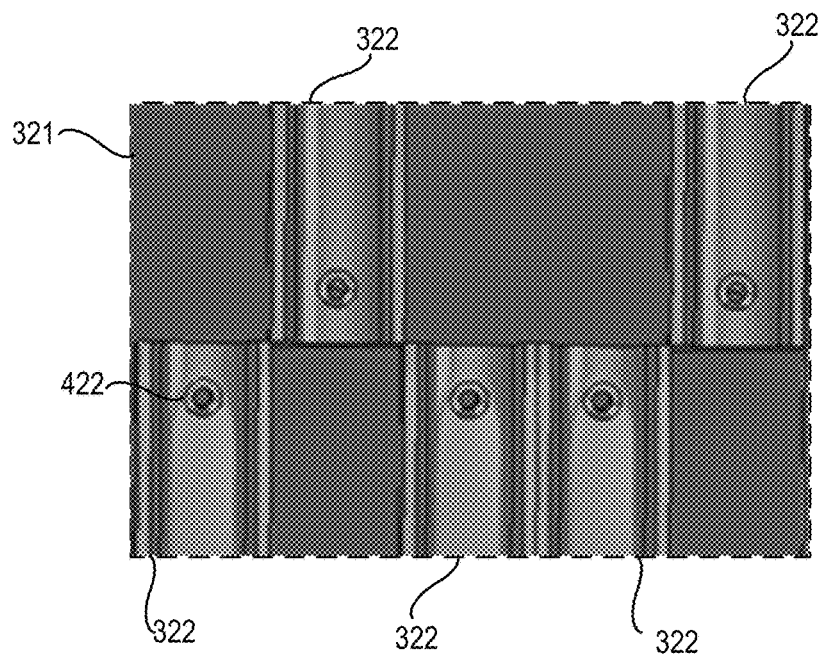
FIG. 6B is a detail view of removeable liners of a bullwheel assembly of a bullwheel tensioner system, in accordance with some examples of the present disclosure.

As illustrated in FIGS. 4, 6A, and 6B, the removeable liners 322 can be attached to the wheel with one or more fasteners 422. In this way, individual sections of the removeable liners 322 can be replaced when damaged or as needed, rather than replacing all of the removeable liners 322. The fasteners 422 can be disposed in the removeable liner 322 between grooves 622 (as illustrated in FIG. 6A) or within the grooves 622 (as illustrated in FIG. 6B).

Figure 6C:
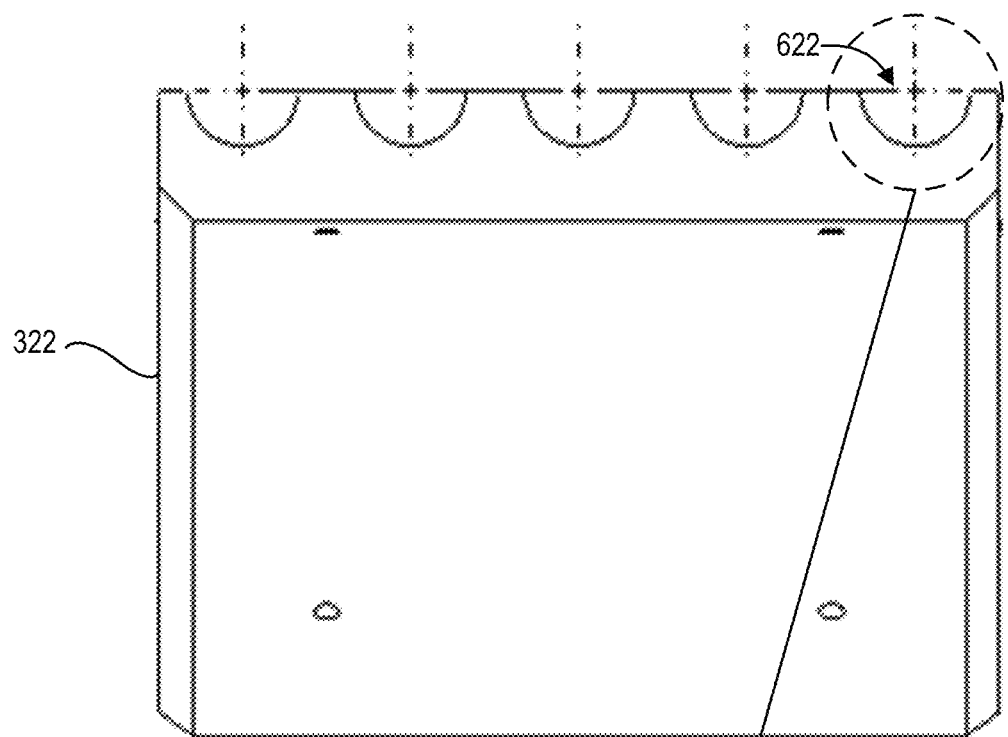
FIG. 6C is a side view of a removeable liner and wheel of the bullwheel assembly, in accordance with some examples of the present disclosure.
Figure 6D:
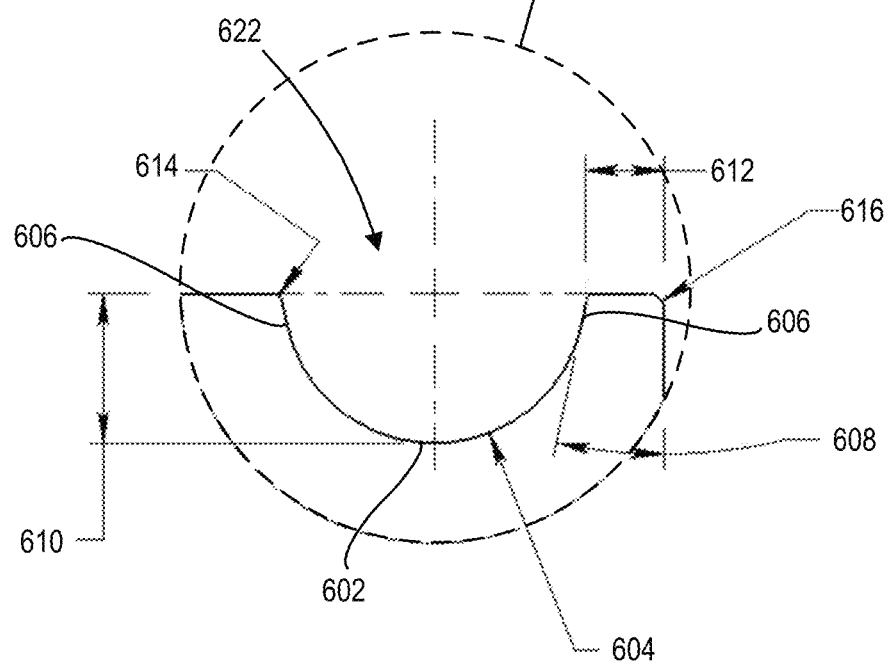
FIG. 6D is a detail view of a groove formed in a removeable liner of a bullwheel assembly of FIG. 6C, in accordance with some examples of the present disclosure.

FIG. 6C is a front view of a removeable liner 322 showing the grooves 622 formed therein while FIG. 6D is a detail view of the groove 622 shown in FIG. 6C, in accordance with some examples of the present disclosure. The removeable liner 322 can include a groove 622 that can be sized to receive a plurality of sizes of electrical utility lines. As will be appreciated by one of skill in the art, when pulling a line during installation or reconductoring projects, the force applied to the line can be substantial. Accordingly, having a wheel 321 with a sufficient diameter can help to prevent damaging the line. The wheel 321, for example, can have an outer diameter of approximately 35 inches, 45 inches, 50 inches, 60 inches, or any other suitable diameter for the application. As a non-limiting example, the wheel 321 can have a diameter of approximately 39 inches. Furthermore, the wheel 321 and the removeable liner 322 together can be configured such that the bullwheel assembly 120 has a bottom of groove diameter of approximately 36 inches, 40 inches, 42 inches, 48 inches, 54 inches, 60 inches, 66 inches, 72 inches or any other suitable diameter for the application. As a non-limiting example, the wheel 321 and the removeable liner 322 together can be configured such that the bullwheel assembly 120 has a bottom of groove diameter of approximately 40.7 inches. As will be appreciated, the bottom of groove diameter can be sized to ensure the line does not exceed the minimum bend radius recommended for the line.

Another way to prevent damage to a line is to include a groove 622 that provides sufficient contact to the line while the line is being installed. In other words, the groove 622 should be sized such that the line contacts a sufficient amount of the surface of the groove 622 to prevent the line from slipping and being damaged. As illustrated in FIG. 6D, the groove 622 can have bottom surface 602 having a radius 604 and two sidewalls 606 forming a flare angle 608. In this way, this groove 622 can be sized to receive lines of various diameters without requiring the operator of the bullwheel tensioner system 100 to remove the removeable liner 322 and replace it with a different sized removeable liner 322 before beginning installation of a different sized line. As a non-limiting example, the groove 622 can be sized to receive lines having diameters ranging from about 0.56 inches (e.g., Penguin 4/0 size conductor has an outer diameter of 0.563 inches) to about 1.14 inches (e.g., Mallard 795.0 size conductor has an outer diameter of about 1.140 inches). As will be appreciated, the range of sizes just described is offered for illustrative purposes and should not be construed as limiting. Accordingly, one of skill in the art will appreciate that the groove 622 can be sized to receive lines having various other sizes depending on the application. To help ensure the groove 622 is properly sized for the range of lines being installed, the groove 622 can have a bottom surface 602 having a radius 604 of approximately 0.5 inches, 0.55 inches. 0.58 inches, 0.6 inches, 0.62 inches, 0.65 inches, 0.7 inches, or any other suitable size radius depending on the range of sizes of line the groove 622 is designed to receive. Furthermore, the flare angles 608 of the sidewalls 606 can be approximately 8 degrees, 10 degrees, 12 degrees, 14 degrees, 16 degrees, or any other suitable flare angle 608 depending on the range of sizes of line the groove 622 is designed to receive. In one example, the groove 622 can have a bottom surface 602 having a radius 604 of approximately 0.6 inches and the flare angles 608 of the sidewalls 606 can be approximately 12 degrees.

As illustrated in FIG. 6D, the groove 622 can a depth 610 such that the groove 622 is configured to receive a sufficient portion of the line, thus facilitating sufficient contact between the line and the removeable liner 322. The depth 610, for example, can be approximately 0.55 inches, 0.57 inches, 0.58 inches, 0.6 inches, 0.62 inches, 0.63 inches, 0.65 inches, or any other suitable depth 610 depending on the range of sizes of line the groove 622 is designed to receive. Furthermore, a length 612 between an edge or an adjacent groove 622 can be approximately 0.2 inches, 0.25 inches, 0.3 inches, 0.315 inches, 0.35 inches, 0.4 inches, 0.5 inches, or any other suitable length 612 depending on the range of sizes of line the groove 622 is designed to receive.

The groove 622, furthermore, can include a rounded edge 614 to remove sharp edges to reduce the possibility of the cable being damaged. The rounded edge 614, for example, can have a radius of approximately 0.03 inches. Similarly, the removeable liner 322 can include a rounded edge 616 to help reduce sharp edge. The rounded edge 616, for example, can be approximately 0.06 inches. Alternatively, the removeable liner 322 can include a chamfered edge.

Figure 5A:
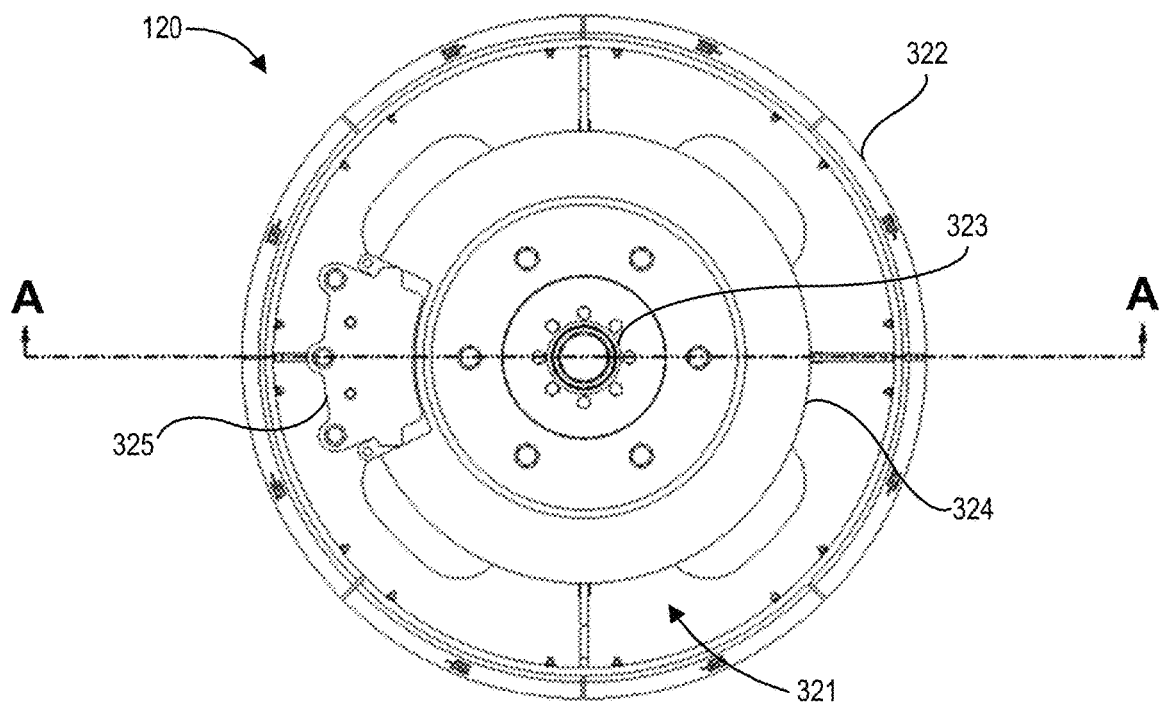
FIG. 5A is a front view of a bullwheel assembly of a bullwheel tensioner system, in accordance with some examples of the present disclosure.
Figure 5B:
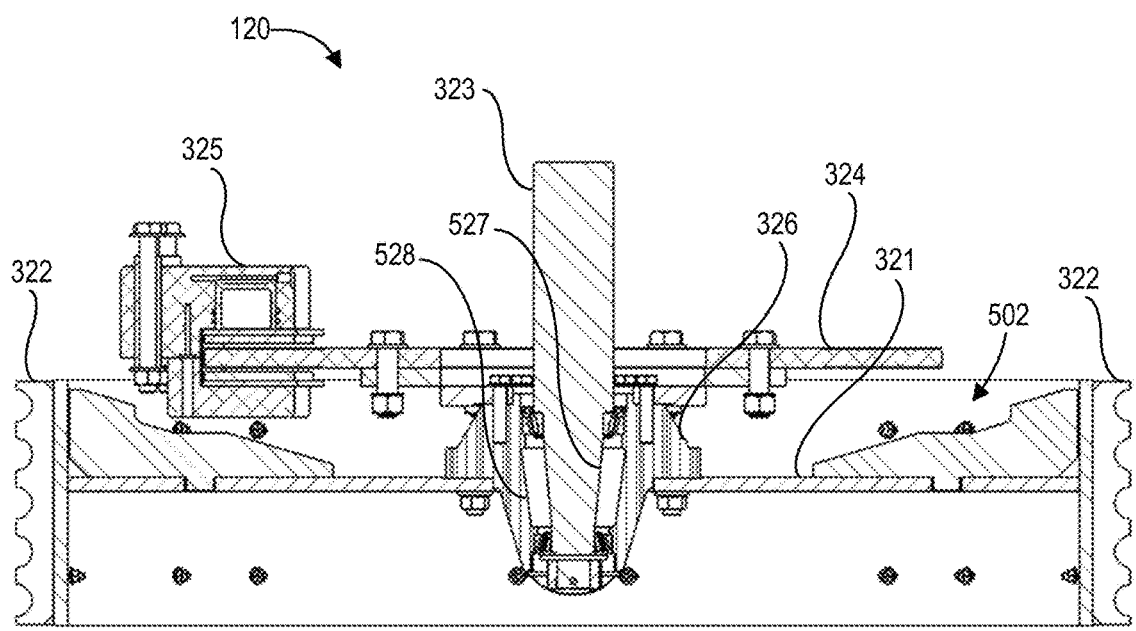
FIG. 5B is cross-sectional view of the bullwheel assembly of FIG. 5A taken along line A-A, in accordance with some examples of the present disclosure.

Returning now to FIGS. 5A and 5B, FIG. 5A is a front view of a bullwheel assembly 120 of a bullwheel tensioner system while FIG. 5B is cross-sectional view of the bullwheel assembly of FIG. 5A taken along line A-A, in accordance with some examples of the present disclosure. As illustrated in FIG. 5B, the hub assembly 326 can include tapered roller bearings 528 that can help to facilitate rotation of the wheel 321 about the shaft 323. The tapered roller bearings 528 can be tapered help to reduce a frictional force between the wheel 321 and the shaft 323 to a greater extent than traditional ball or roller bearings. The shaft 323 can further include a tapered end 527 that can be shaped to conform to an angle formed by the tapered roller bearings 528.

As illustrated in FIG. 5B, the wheel 321 can form a recess 502 in which the disc brake 324 and the brake caliper 325 can be, at least partially, disposed in. In this way, the bullwheel assembly 120 can comprise a more compact shape than existing bullwheel assembly designs. Furthermore, although not shown, the wheel 321 can be configured such that the removeable liners 322 can extend beyond an outer edge of the brake caliper 325 and/or disc brake 324 such that the brake caliper 325 and/or disc brake 324 are disposed substantially within the recess 502.

Figure 6E:
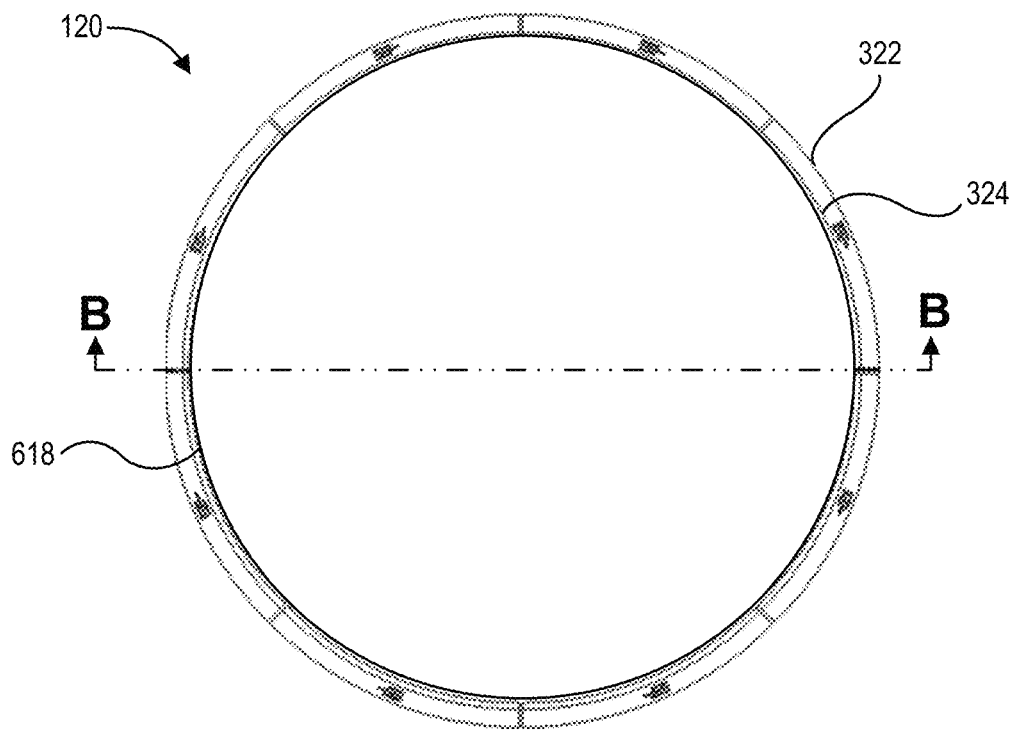
FIG. 6E is a side view of bullwheel assembly of a bullwheel tensioner system, in accordance with some examples of the present disclosure.
Figure 6F:
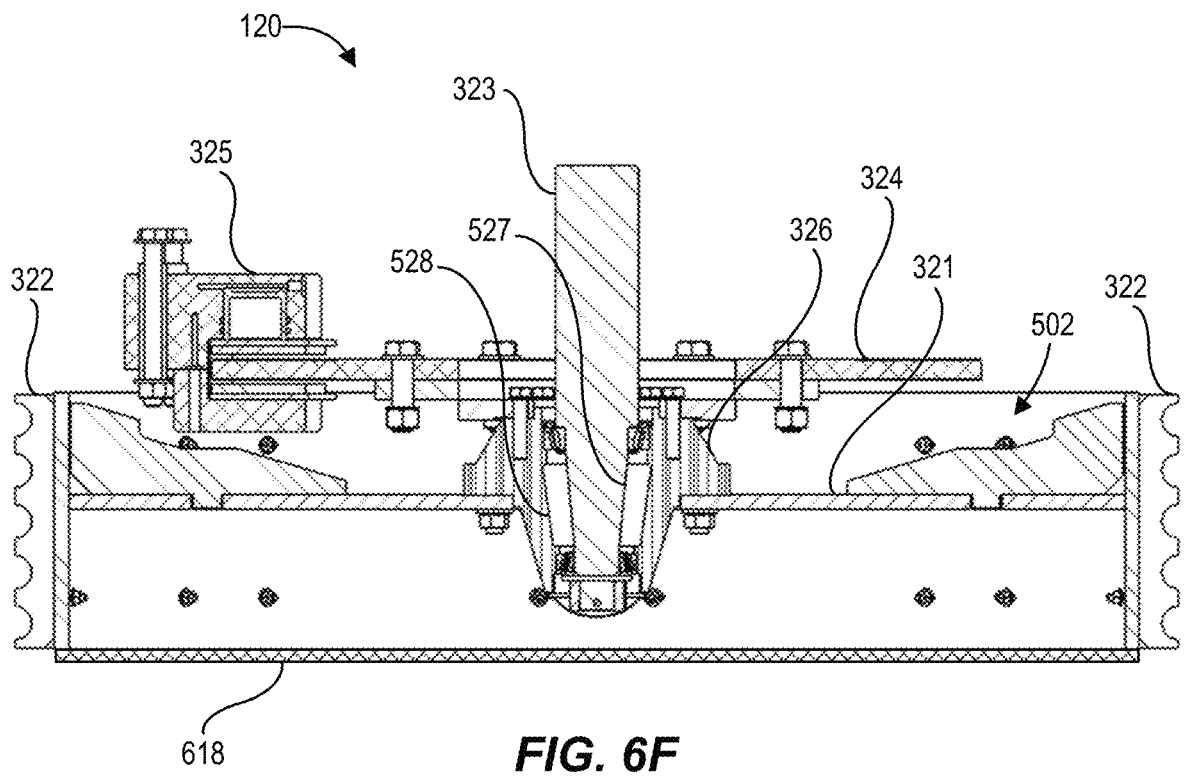
FIG. 6F is a cross-sectional view of the bullwheel assembly taken along line B-B of FIG. 6E, in accordance with some examples of the present disclosure.

FIG. 6E is a side view of the bullwheel assembly 120 while FIG. 6F is a cross-sectional view of the bullwheel assembly 120 taken along line B-B of FIG. 6E, in accordance with some examples of the present disclosure. As illustrated in FIGS. 6E and 6F, the bullwheel assembly 120 can include a cover 618 that can be attached to a side of the wheel 321 to help enclose the wheel 321, thereby preventing foreign objects (including an individual's hand, etc.) from entering the wheel 321. In this way, the bullwheel assembly 120 can be configured to help reduce the likelihood of an injury. Although not shown, if the brake caliper 325 and disc brake 324 are disposed substantially within the recess 502, the cover 618 can also be configured to cover the brake caliper 325 and the disc brake 324 (e.g., the bullwheel assembly 120 can have a first cover 618 on a first side of the wheel 321 and a second cover 618 on a second side of the wheel 321).

Figures 7A, 7B:
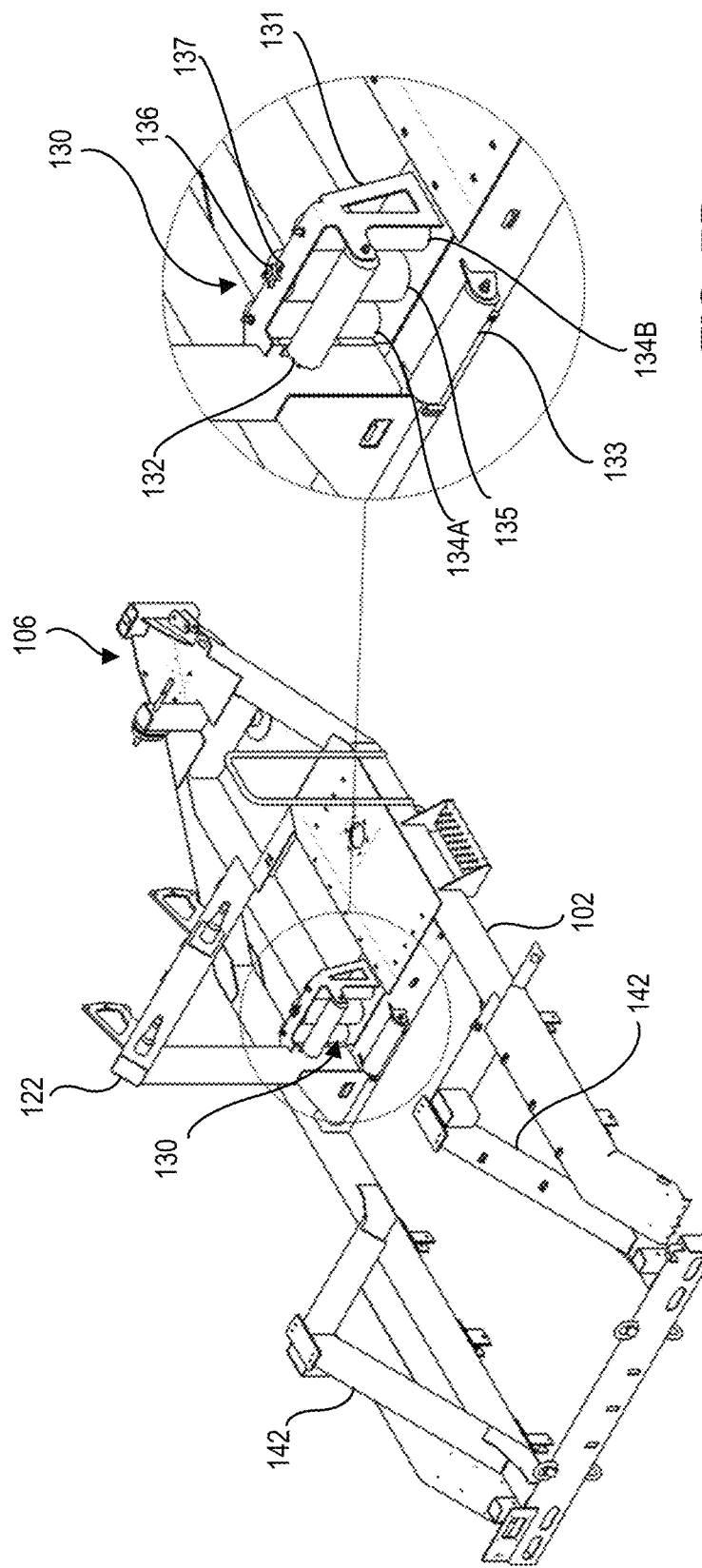
FIG. 7A is a rear perspective view of a chassis and a fairlead assembly of a bullwheel tensioner system, in accordance with some examples of the present disclosure.
FIG. 7B is a detail view of the chassis and fairlead assembly of FIG. 7A, in accordance with some examples of the present disclosure.

FIG. 7A is a rear perspective view of the 102 chassis and the fairlead assembly 130 while FIG. 7B is a detail view of the fairlead assembly 130, in accordance with some examples of the present disclosure. The fairlead assembly 130 can include a fairlead assembly frame 131 that supports a first horizontal roller 132, a second horizontal roller 133, one or more first vertical rollers 134A, 134B, and a second vertical roller 135. The first horizontal roller 132 can be disposed near a top of the fairlead assembly 130 while the second horizontal roller 133 can be disposed near a bottom of the fairlead assembly 130. As shown the first and second horizontal rollers 132, 133 can be disposed between nearer the reel carrier assembly 140 than the first and second vertical rollers 134A, 134B, and 135. In this way, the first and second horizontal rollers 132, 133 can be configured to contact a line being pulled from a reel before the first and second vertical rollers 134A, 134B, and 135.

Figure 11:
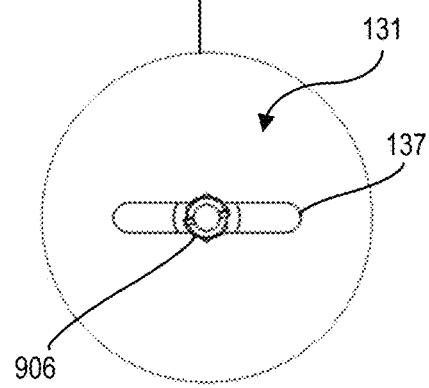
FIG. 11 is a detail view of part of the fairlead assembly shown in FIG. 10, in accordance with some examples of the present disclosure.

The first and second horizontal rollers 132, 133 and the first vertical rollers 134A, 134B can each be rotatably attached to the fairlead assembly frame 131 to permit the respective rollers to roll when a line is drawn across a surface of the roller. The second vertical roller 135 can similarly be rotatably attached to the fairlead assembly frame 131. The second vertical roller 135 can also be slidably attached to the fairlead assembly frame 131. The second vertical roller 135, for example, can have an adjustable fastener 136 that can be transitioned between a secured configuration to an unsecured configuration. When in the secured configuration, the adjustable fastener 136 can be configured to prevent the second vertical roller 135 from sliding along the fairlead assembly frame 131. When in the unsecured configuration, the adjustable fastener 136 can permit the second vertical roller 135 to slide along a slot 137 formed in the fairlead assembly frame 131 (as illustrated in FIGS. 7B and 11). In this way, the fairlead assembly 130 can be configured to adjust a gap through the fairlead assembly.

Figure 8A:
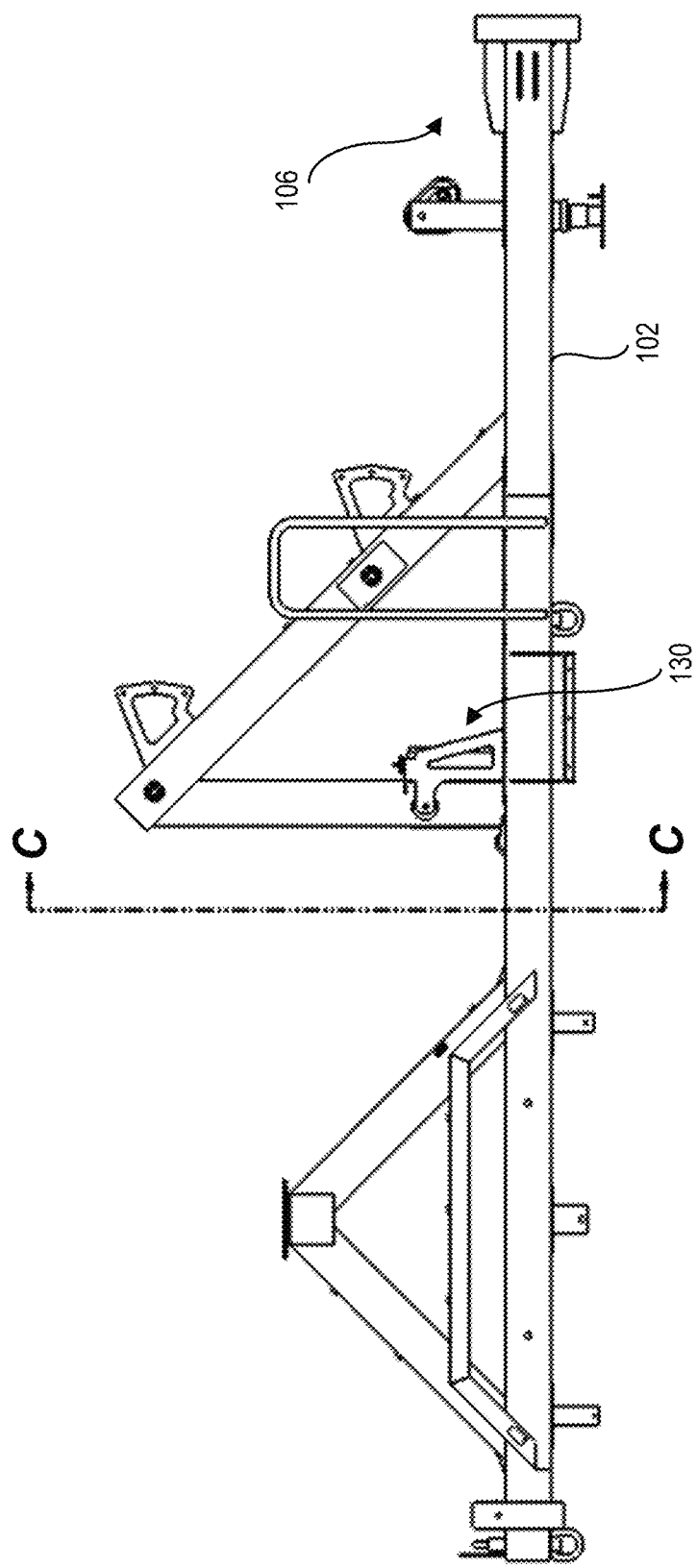
FIG. 8A is a side view of a chassis and a fairlead assembly of a bullwheel tensioner system, in accordance with some examples of the present disclosure.
Figure 8B:
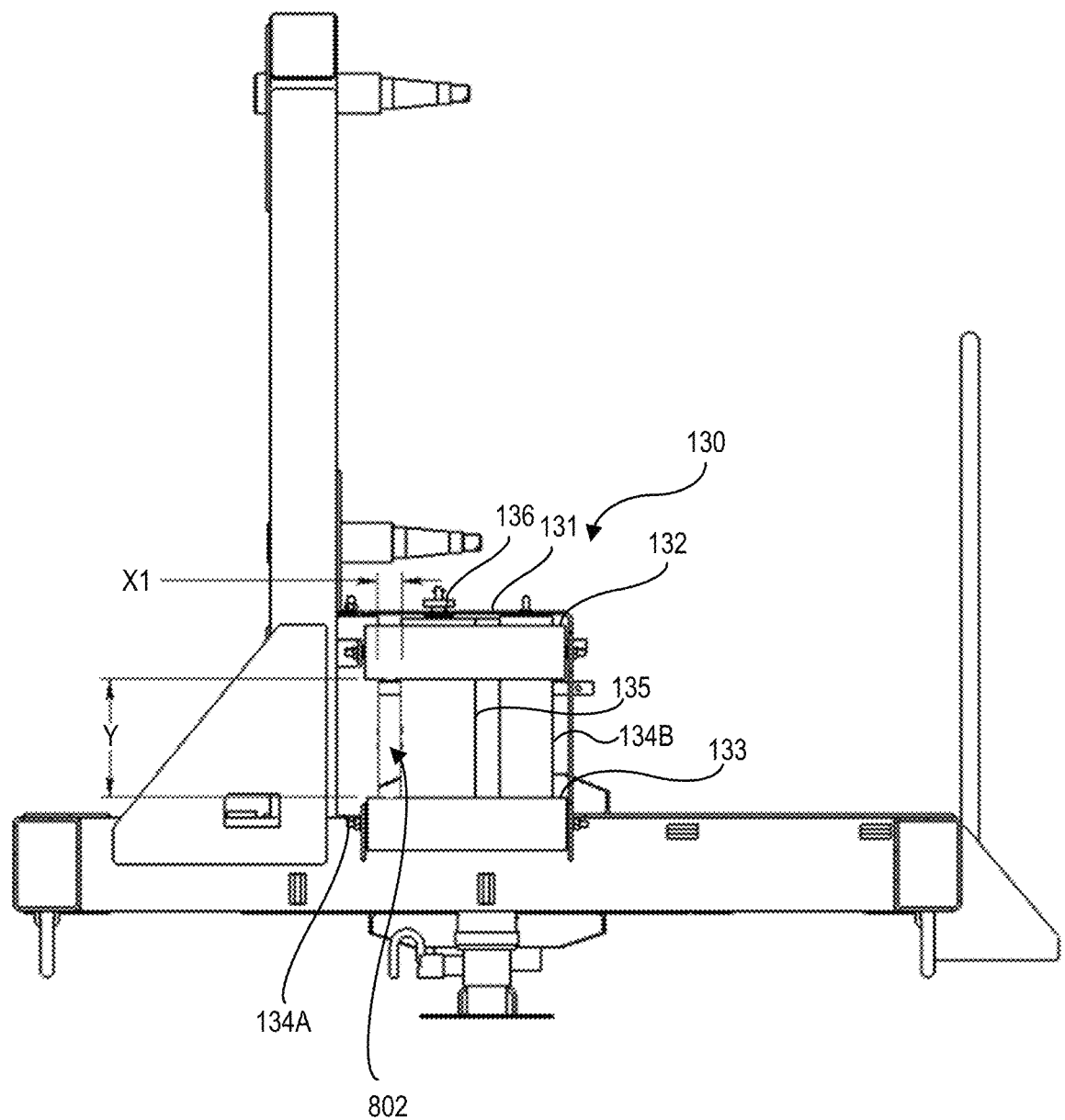
FIG. 8B is a cutaway view of the chassis and the fairlead assembly of a bullwheel tensioner system of FIG. 8A taken along line C-C, in accordance with some examples of the present disclosure.
Figure 8C:
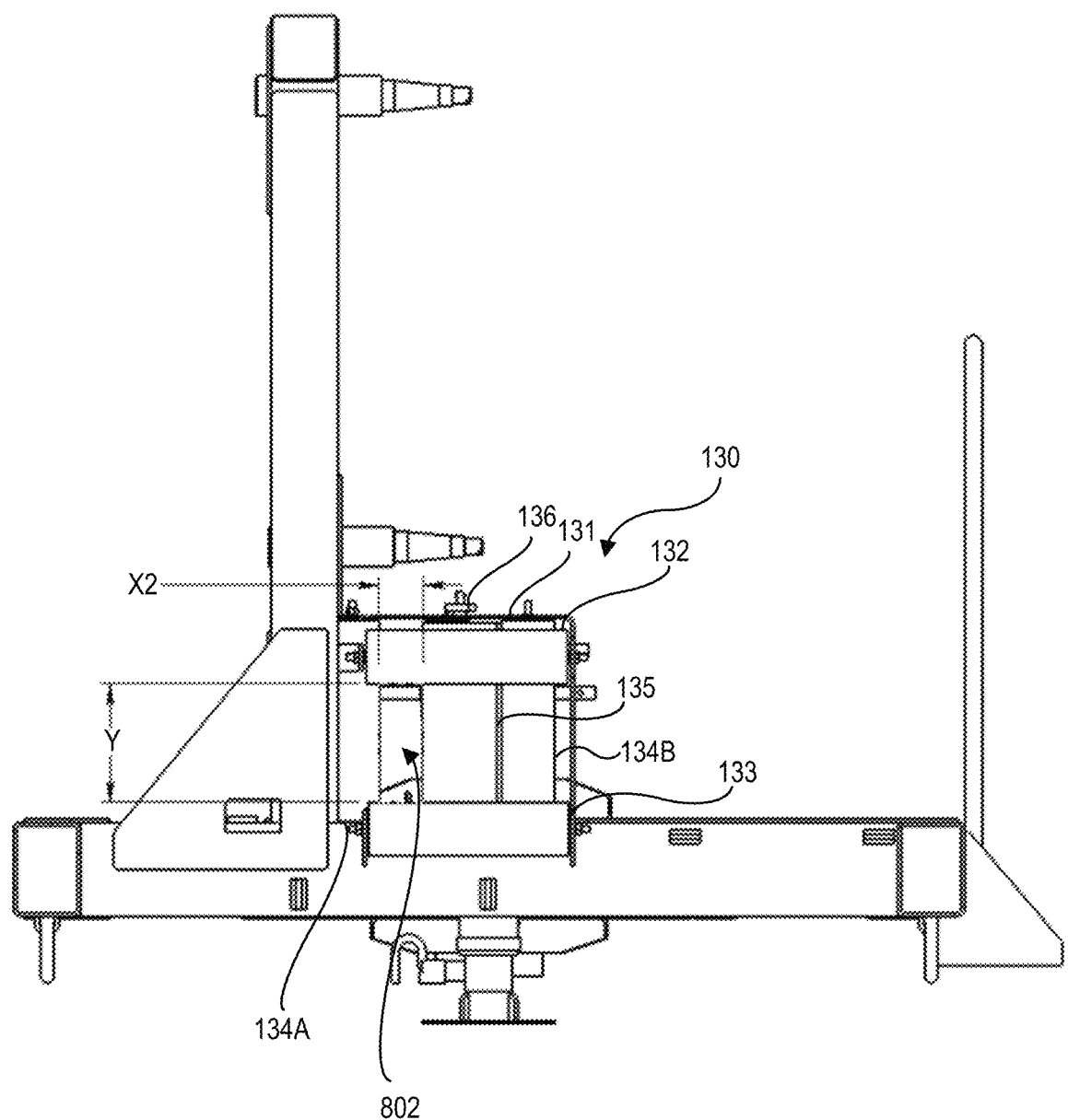
FIG. 8C is another cutaway view of the chassis and the fairlead assembly of a bullwheel tensioner system of FIG. 8A taken along line C-C, in accordance with some examples of the present disclosure.

FIG. 8A is a side view of the chassis 102 and the fairlead assembly 130 while FIGS. 8B and 8C illustrate a cutaway view of the chassis 102 and the fairlead assembly 130 of FIG. 8A taken along line C-C, in accordance with some examples of the present disclosure. As illustrated in FIG. 8B, the fairlead assembly 130 can be in a first configuration wherein a gap 802 is present between first and second horizontal rollers 132, 133, the first vertical roller 134A, and the second vertical roller 135. The gap 802 can have a width X1 and a height Y. As illustrated in FIG. 8C, the fairlead assembly 130 can be transitioned to a second configuration wherein the gap 802 between first and second horizontal rollers 132, 133, the first vertical roller 134A, and the second vertical roller 135 is adjusted to have a width X2 and the same height Y. In other words, the second vertical roller 135 can be slid along the fairlead assembly 130 frame 131 to adjust the gap 802.

The width X2 can be greater than the width Y. As non-limiting examples, the width X1 can be approximately 1.8 inches while the width X2 can be approximately 3.3 inches. The height Y can be approximately 8.85 inches. As will be appreciated, the width X1, the width X2, and the height Y can be greater or smaller lengths depending on the particular configuration and application. Furthermore, as will be appreciated, a similar gap 802 can be formed and similarly adjusted between the first and second horizontal rollers 132, 133, the first vertical roller 134B, and the second vertical roller 135 by adjusting a position of the second vertical roller 135.

By adjusting the size of the gap the fairlead assembly 130 can be configured to permit an operator, lineman, or other user of the bullwheel tensioner system 100 to pass a line and other objects attached to the line (e.g., swivel, couplers, conductor grips, etc.) through the fairlead assembly 130 without needing to disassemble the fairlead assembly 130. This can help reduce time that can be lost during setup of the bullwheel tensioner system 100.

Figure 9:
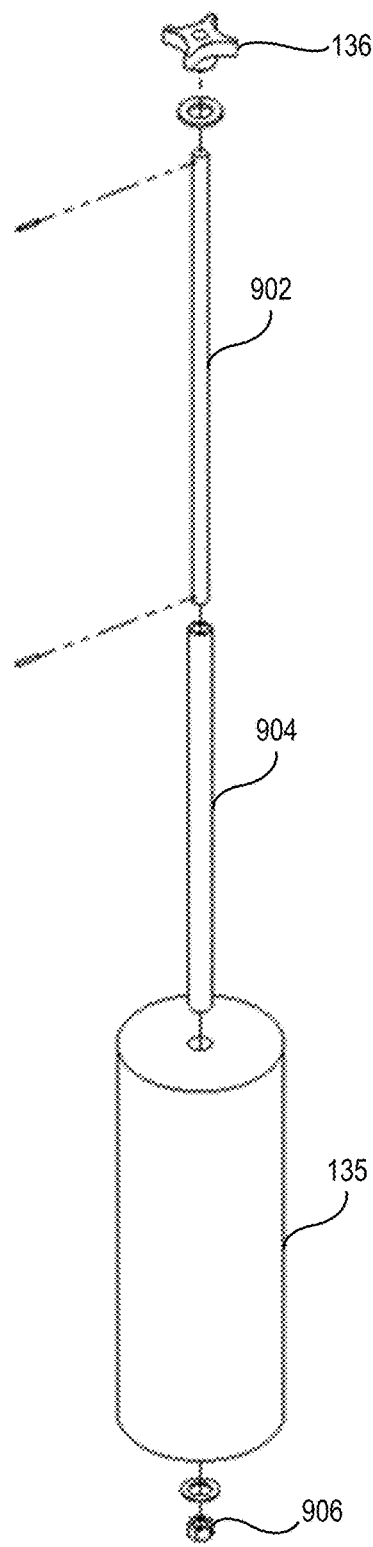
FIG. 9 is an exploded view of a roller of a fairlead assembly of a bullwheel tensioner system, in accordance with some examples of the present disclosure.

FIG. 9 is an exploded view of a second vertical roller 135 of a fairlead assembly 130, in accordance with some examples of the present disclosure. The second vertical roller 135 can include a shaft 902, an outer sleeve 904, a nut 906, and an adjustable fastener 136. As will be appreciated, the components illustrated in FIG. 9 are offered for illustrative purposes and are not meant to be construed as limiting. The shaft 902 can include threaded end to facilitate tightening and loosening of the second vertical roller 135. The sleeve 904 can be configured to reduce friction between the shaft 902 and the second vertical roller 135.

Figure 10:
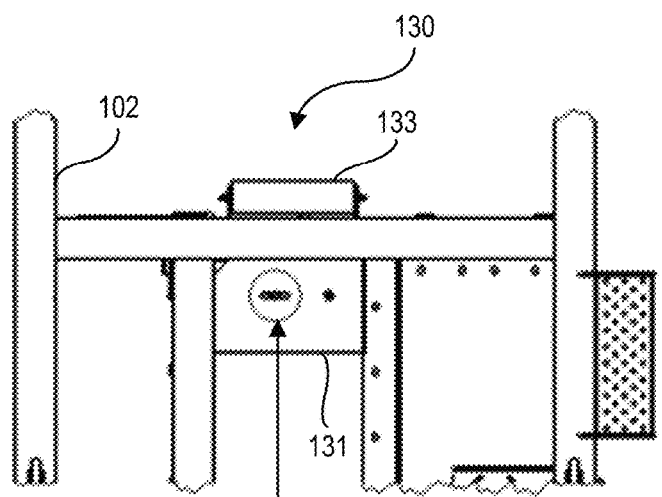
FIG. 10 is a bottom detail view of chassis and fairlead assembly of a bullwheel tensioner system, in accordance with some examples of the present disclosure.

FIG. 10 is a bottom detail view of chassis 102 and fairlead assembly 130 while FIG. 11 is a detail view of a portion of the fairlead assembly 130 shown in FIG. 10, in accordance with some examples of the present disclosure. As illustrated in FIG. 11, the fairlead assembly frame 131 can include a slot 137 that extends along a length of the fairlead assembly frame 131 to permit the second vertical roller 135 to slide between the first position and the second position. The slot 137 can be sized to permit the second vertical roller 135 to slide a sufficient distance to a sufficient gap size for the particular application.

Figure 12A:
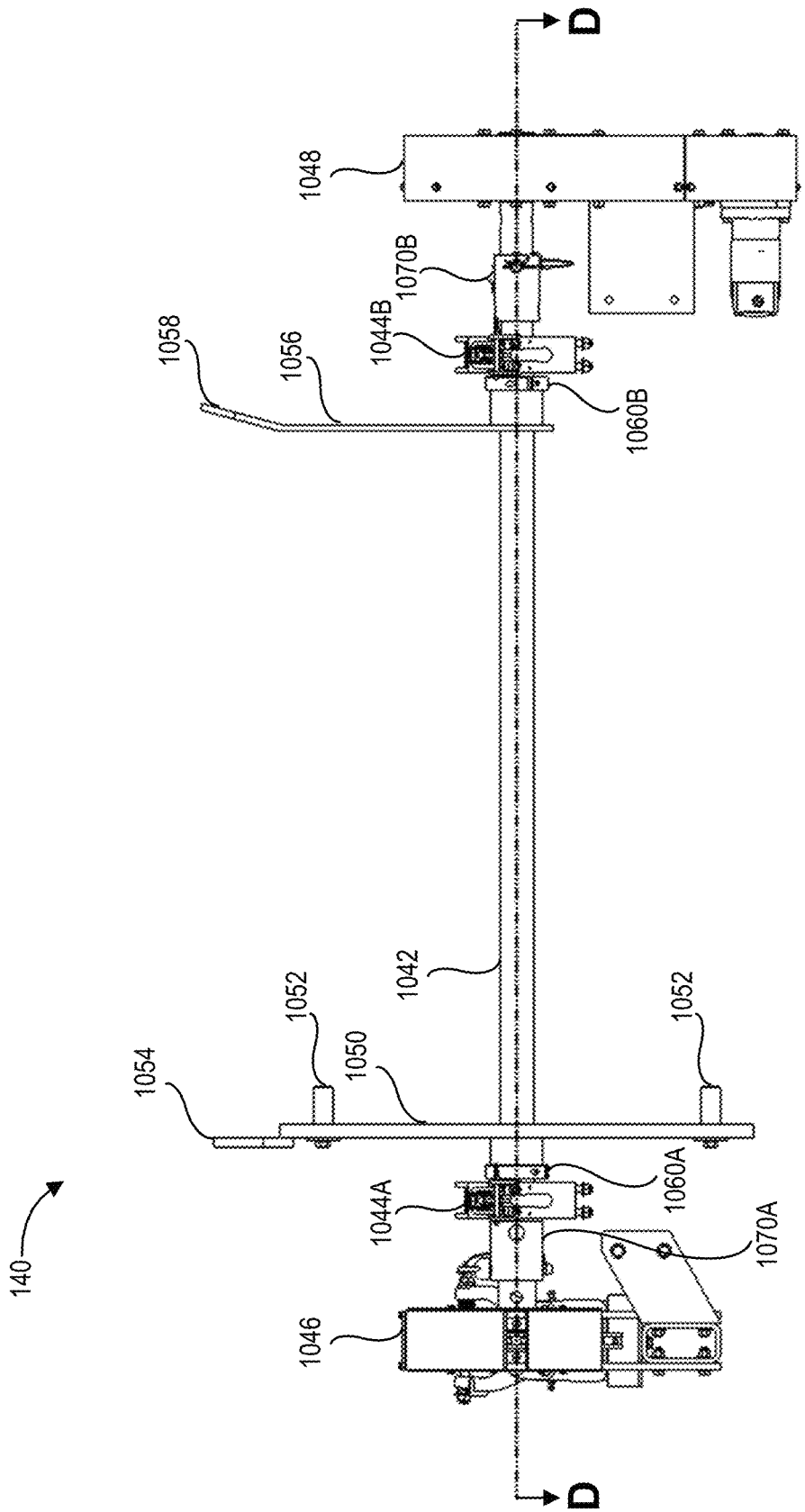
FIG. 12A is a top view of a reel carrier assembly of a bullwheel tensioner system, in accordance with some examples of the present disclosure.
Figure 12B:
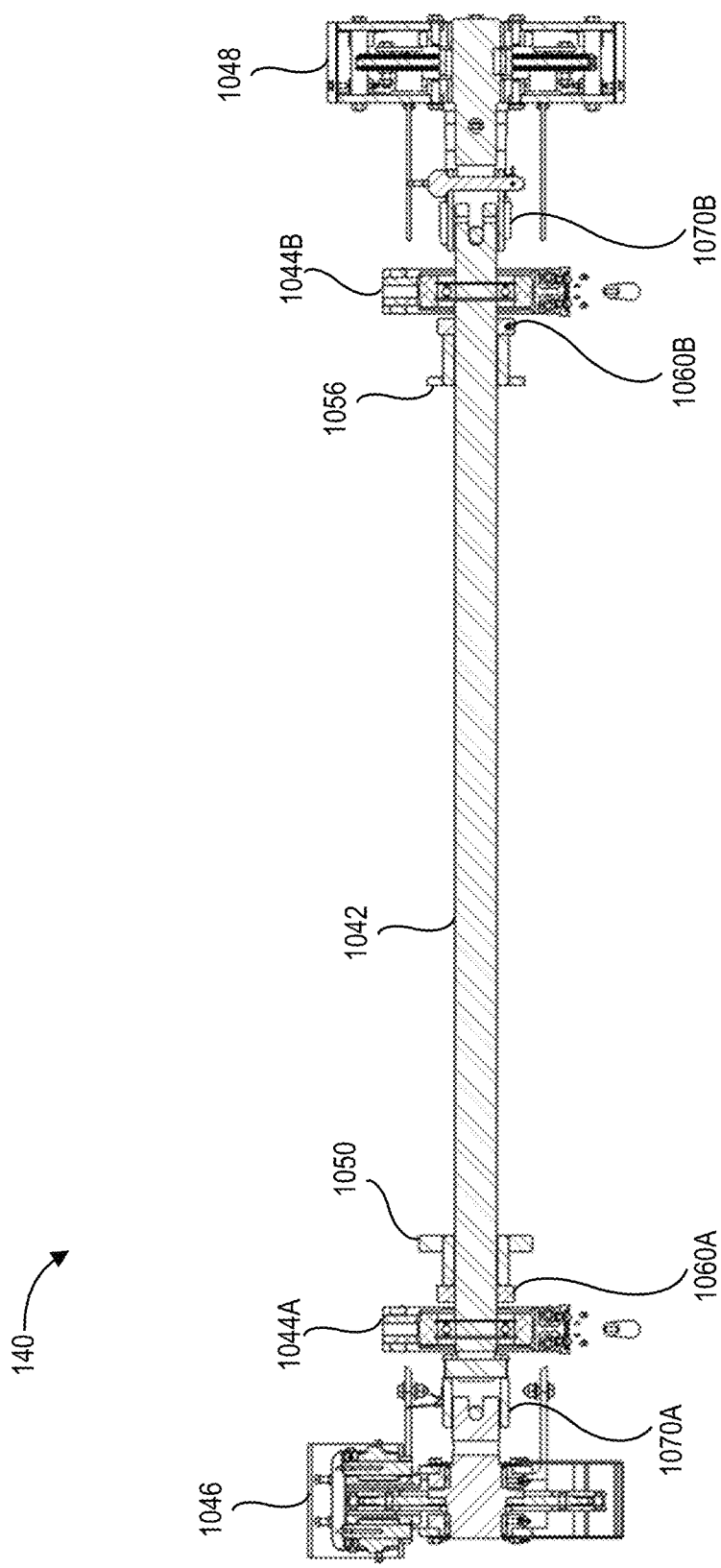
FIG. 12B is a cutaway view of the reel carrier assembly of FIG. 12A taken along line D-D, in accordance with some examples of the present disclosure.

FIG. 12A is a top view of a reel carrier assembly 140 of a bullwheel tensioner system 100 while FIG. 12B is a cutaway view of the reel carrier assembly 140 of FIG. 12A taken along line D-D, in accordance with some examples of the present disclosure, in accordance with some examples of the present disclosure. As illustrated in FIGS. 12A and 12B, the reel carrier assembly 140 can be configured to support a reel (not shown) that can have line disposed thereon to facilitate installation of the line. The reel carrier assembly 140 can be supported by a reel carrier frame 142 (as illustrated in FIGS. 1 and 2). The reel carrier assembly 140 can include a shaft 1042, one or more releasable support couplers 1044A, 1044B, a drive assembly 1046, and a brake assembly 1048. The one or more releasable support couplers 1044A, 1044B can be configured to be opened to permit the shaft (and reel) to be lifted from the bullwheel tensioner system 100. The drive assembly 1046 and the brake assembly 1048 can each be coupled to the shaft 1042 via a shaft coupler 1072A, 1072B.

As will be appreciated, the drive assembly 1046 can be configured to rotate the shaft 1042 when coupled to the shaft 1042. The drive assembly 1046 can be any form of drive assembly such as a combustion engine, an electric motor, and/or a hydraulic system. To help cause the reel (not shown) to rotate along with the shaft 1042, the reel carrier assembly 140 can include a drive bar 1050 having one or more drive pins 1052 that can be in mechanical communication with the reel to cause the reel to rotate with the shaft 1042. The reel carrier assembly 140 can include a lifting bar 1056 that can be disposed on an opposite side of a reel mounted on the shaft 1042. The drive bar 1050 can have a drive bar lift point 1054 and the lifting bar 1056 can include a lifting bar 1056 lift point 1058 to facilitate lifting of a reel mounted on the shaft 1042.

The reel carrier assembly 140 can include one or more clamp devices 1060A, 1060B that can be configured to prevent the reel from sliding axially along a length of the shaft 1042. Although shown as being disposed proximate the releasable support couplers 1044A, 1044B, the clamp devices 1060A, 1060B can be slid along the length of the shaft 1042 to abut the edge reel mounted on the shaft 1042. In other words, the clamp devices 1060A, 1060B can be repositioned on the shaft 1042 to secure a reel in place on the shaft 1042. In this way, the clamp devices 1060A, 1060B can be used to center a reel on the shaft 1042 so that the line can be pulled from the reel with minimal or no "slap" or jumping of the line that can occur as a result of the reel not being centered on the shaft 1042.

The clamp devices 1060A, 1060B can be configured to transition between a secured configuration and an unsecured configuration. In the secured configuration, the clamp devices 1060A, 1060B create a sufficient friction force with the shaft 1042 that a reel is prevented from sliding along a length of the shaft 1042. In the unsecured configuration, the clamp devices 1060A, 1060B can be loosened such that the clamp devices 1060A, 1060B and, consequently, a reel can be slid along the shaft 1042. The clamp devices 1060A, 1060B can be configured such that the clamp devices 1060A, 1060B can be transitioned between the secured configuration and the unsecured configuration without requiring the use of a tool. In other words, the clamp devices 1060A, 1060B can be configured such that an operator, lineman, or other user of the bullwheel tensioner system 100 can adjust a position of the reel without needing to find and use an additional tool. As will be appreciated, this can help to reduce the time required to set up the bullwheel tensioner system 100.

FIG. 13A is an exploded view of a reel carrier assembly 140 while FIG. 13B is a detail view of a portion of the reel carrier assembly 140 shown in FIG. 13A, in accordance with some examples of the present disclosure. As illustrated in FIGS. 13A and 13B, the shaft 1042 can include a slot 1180A, 1180B and the drive bar 1050 can include a key 1182 that is configured to extend, at least partially, into the slot 1180A. Although not shown but as will be appreciated, the lifting bar 1056 can include a similar key that extends, at least partially, into the slot 1180B formed near the lifting bar 1056.

By include a slot 1180A, 1180B and a key 1182, the reel carrier assembly 140 can be configured such that the drive assembly 1046 and/or the brake assembly 1048 can be mechanically coupled to the reel mounted on the shaft 1042. In this way, when the drive assembly 1046 causes the shaft 1042 to rotate, the reel can also be rotated. Similarly, when the brake assembly 1048 causes the shaft 1042 to slow down or stop rotating, the reel can similarly slow down or stop rotating.

The slot 1180A can be disposed proximate the drive bar 1050 and extend a predetermined length along the shaft 1042 while the slot 1180B can be disposed proximate the lifting bar 1056 and extend another predetermined length along the shaft 1042. Alternatively, the slots 1180A, 1180B can be combined to form a single, continuous slot. As will be appreciated, the slot 1180A, 1180B can be sized to accommodate varying sizes of reels that can be mounted on the shaft 1042.

Figure 14:
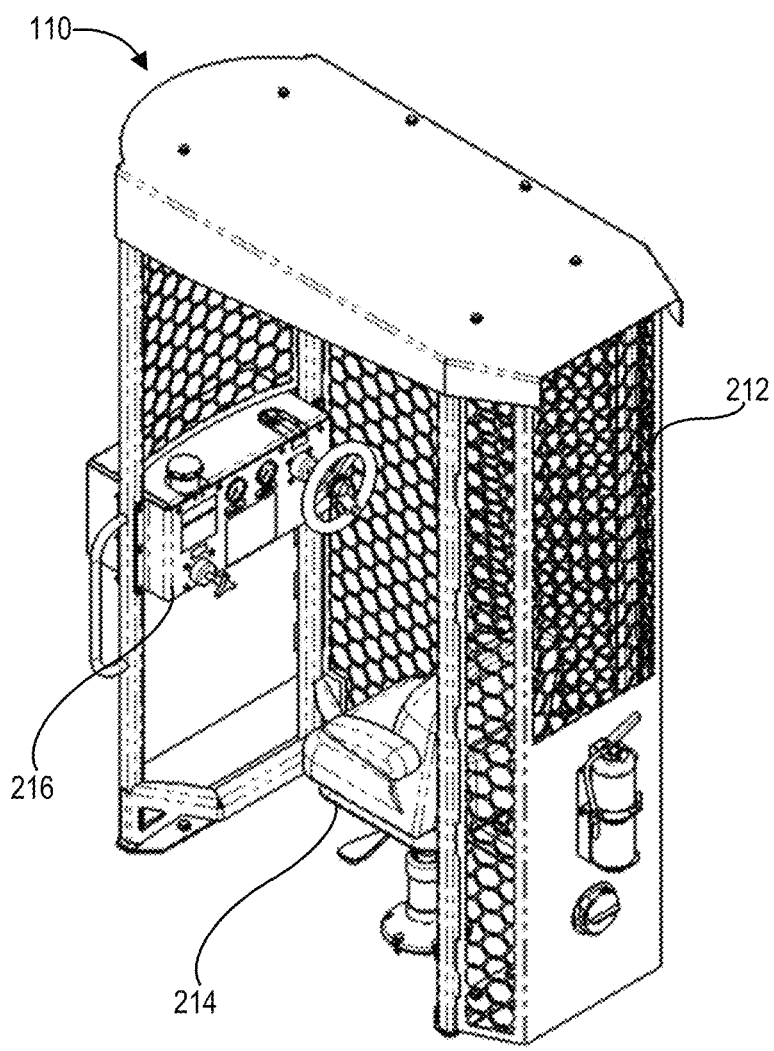
FIG. 14 is a front, perspective view of an example operator station of a bullwheel tensioner system, in accordance with some examples of the present disclosure.
Figure 15:
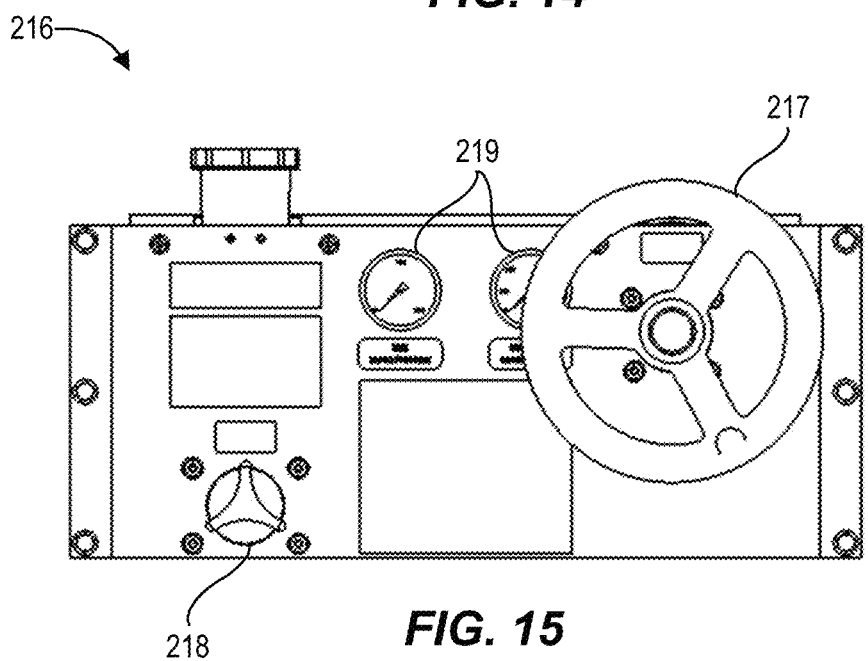
FIG. 15 is a front view of an example of a control panel of an a bullwheel tensioner system, in accordance with some examples of the present disclosure.

Referring now to FIGS. 14 and 15, the operator station 110 can have a safety screen 212 and a control panel 216. The safety screen 212 can be configured to protect an operator of the bullwheel tensioner system 100 while the control panel 216 can be configured to enable an operator to control the bullwheel tensioner system 100.

The safety screen 212 can be curved to increase the protective surface area and to increase the deflection of forces or objects that happen to strike the safety screen 212. Additionally, the curvature of the safety screen 212 can be concentric or nearly concentric with the operator's point of view so that the line of sight of the operator can always be perpendicular (or close to perpendicular) to the safety screen. In such a manner, the operator can have a minimally obstructed view through the safety screen. The safety screen 212 can further comprise a mesh (shown), window, grating, holes, or other suitable design such that the bullwheel assembly 120 and reel carrier assembly 140 (or other components attached to the chassis 102) are visible through the safety screen 212. The visual designs (or apertures of the mesh, or grating, etc.) can be sufficiently small in size such that a loose line (or other projectile) is prevented from crossing into the operator station 110 through the safety screen 212, while an operator is still able to see out of the safety screen 212. For instance, if a metal grating is used, the spaces between the grating can be small enough to prevent a loose line or other debris from entering the operator station 110 while still remaining large enough to ensure the other components attached to the chassis 102 are visible. Alternatively, the safety screen 212 can comprise a transparent material, rather than holes or other openings. For example, the safety screen 212 can comprise a transparent window made from an acrylic or another transparent plastic material.

The safety screen 212 may additionally have sufficient strength such that the front safety screen is able to withstand forces from flying objects such as rope, conductor, swivels, and grips caused by a line breaking or some portion of a supporting structure breaking. The safety screen 212 can also have cutouts or apertures of a specific shape when the safety screen 212 employs a mesh (as shown). For example, the safety screen 212 can comprise hexagonal cutouts or apertures. The hexagonal cutouts can break up horizontal and vertical lines so that an operator can better distinguish objects outside the safety screen 212. It is understood that other shapes and patterns of cutouts can be used to create the safety screen 212 and distinguish the lines of the safety screen 212 from other lines outside of the safety screen 212.

As shown in FIGS. 14 and 15, the control panel 216 can have one or more controls connected to one or more components of the bullwheel tensioner system 100. For example, the control panel 216 can include a wheel 217 that is configured to control a braking force of the brake caliper 325 of the bullwheel assembly 120 to help control an amount of tension the bullwheel tensioner system 100 applies to a line. The control panel 216 can further include a control knob 218 that can be configured to control the reel carrier brake assembly 1048 to control the amount of force necessary to pull the line off the reel. The control panel 216 can further include various gauges or dials intended to provide a status of the bullwheel tensioner system 100. For example, the gauges can display temperature and/or pressure of the hydraulic system, rotation speed, brake temperature, etc. As will be appreciated, the control panel 216 can be configured such that an operator can view the status of various components of the bullwheel tensioner system 100 and control the various components of the bullwheel tensioner system 100.

While several possible examples are disclosed above, examples of the present disclosure are not so limited. For instance, while the system is discussed above with reference to suspending power or communications lines, the system could also be used in many other industries such as transportation (e.g., towing, cables cars, street cars, and trains); rope for climbing, rigging, and boundaries; and virtually any other types of lines that need to be strung and/or suspended. In addition, while various features are disclosed, other designs could be used. Such changes are intended to be embraced within the scope of this disclosure. The presently disclosed examples, therefore, are considered in all respects to be illustrative and not restrictive.

What is claimed is:

1. A bullwheel tensioner system comprising:
   a chassis;
   a reel carrier assembly attached to the chassis and configured to support a reel having an electrical utility line disposed thereon, the reel carrier assembly comprising:
      a reel carrier frame;
      a reel shaft supported by the reel carrier frame, the reel shaft comprising a slot formed therein;
      a drive bar slidably attached to the reel shaft, the drive bar having a key configured to extend into the slot formed in the reel shaft;
      a clamp slidably attached to the reel shaft, the clamp configured to couple to the reel shaft such that the clamp prevents a reel supported by the reel shaft from sliding axially along the reel shaft;
   a fairlead assembly attached to the chassis and configured to receive the electrical utility line; and
   a bullwheel assembly comprising a wheel having plurality of removable liners disposed thereon, each removeable liner of the plurality of removeable liners having a groove formed therein configured to receive and support the electrical utility line.

2. The bullwheel tensioner system of claim 1, wherein the clamp is configured to transition between a secured configuration and an unsecured configuration to facilitate centering of the reel on the shaft,
   wherein, when in the secured configuration, the clamp prevents the reel from sliding axially along the shaft, and
   wherein, when the clamp is in the unsecured configuration, the clamp permits the reel to slide axially along the shaft.

3. The bullwheel tensioner system of claim 1, wherein the fairlead assembly comprises:
   a fairlead assembly frame;
   a first horizontal roller attached to the fairlead assembly frame and disposed proximate a top of the fairlead assembly frame;
   a second horizontal roller attached to the fairlead assembly frame and disposed proximate a bottom of the fairlead assembly frame;
   a first vertical roller attached to the fairlead assembly frame and disposed proximate a side of the fairlead assembly frame; and
   a second vertical roller slidably attached to the fairlead assembly frame, wherein the second vertical roller is adjustable between a first position and a second position.

4. The bullwheel tensioner system of claim 3, wherein the fairlead assembly further comprises:
   a slot extending through the fairlead assembly frame; and
   an adjustable fastener extending through the slot and the second vertical roller,
      wherein the adjustable fastener is configured to prevent the second vertical roller from sliding along a length of the slot when the adjustable fastener is in a secured configuration, and
      wherein the adjustable fastener is configured to permit the second vertical roller to slide along the length of the slot between the first position and the second position when the adjustable fastener is in an unsecured configuration.

5. A bullwheel tensioner system comprising:
   a chassis;
   a reel carrier assembly attached to the chassis and configured to support a reel having an electrical utility line disposed thereon, the reel carrier assembly comprising:
      a reel carrier frame;
      a reel shaft supported by the reel carrier frame, the reel shaft comprising a slot formed therein;
      a drive bar slidably attached to the reel shaft, the drive bar having a key configured to extend into the slot formed in the reel shaft;
      a clamp slidably attached to the reel shaft, the clamp configured to couple to the reel shaft such that the clamp prevents a reel supported by the reel shaft from sliding axially along the reel shaft;
   a fairlead assembly attached to the chassis and configured to receive the electrical utility line; and
   a bullwheel assembly, the bullwheel assembly comprising:
      a wheel configured to rotate about a central axis extending through a center of the wheel;
      a central hub assembly attached to the wheel proximate the center of the wheel, the central hub assembly being configured to permit the wheel to rotate about the central axis;
      a shaft in mechanical communication with the central hub assembly and configured to support the central hub assembly;
      a bullwheel support frame attached to the chassis and in mechanical communication with the shaft, the bullwheel support frame being configured to support the shaft;
      a plurality of removeable liners attached to the wheel and disposed along an outer circumferential surface of the wheel, each removeable liner of the plurality of removeable liners having a groove formed therein, the groove being configured to receive and support a first electrical utility line having an outer diameter of approximately 0.5 inches and a second electrical utility line having an outer diameter of approximately 1.2 inches.

6. The bullwheel tensioner system of claim 5, wherein the groove comprises a bottom surface and two sidewalls extending outwardly from the bottom surface to form the groove, the bottom surface having a radius sized to receive the first electrical utility line, and
   wherein the two sidewalls extend outwardly from the bottom surface at a predetermined flare angle such that the groove is configured to receive the first electrical utility line and the second electrical utility line.

7. The bullwheel tensioner system of claim 6, wherein the radius is approximately 0.6 inches and the predetermined flare angle is approximately 12 degrees.

8. The bullwheel tensioner system of claim 5, wherein the hub assembly comprises a plurality of tapered bearings configured to facilitate rotation of the wheel about the central axis.

9. The bullwheel tensioner system of claim 8, wherein the shaft comprises a tapered end, the tapered end conforming to an angle formed by the tapered bearings.

10. The bullwheel tensioner system of claim 5 further comprising:
a disc brake attached to the central hub; and
a brake caliper attached to the bullwheel support frame, the brake caliper configured to apply a force to the disc brake to control a rotation of the wheel.

11. The bullwheel tensioner system of claim 10, wherein the disc brake and brake caliper are disposed at least partially within a recess formed in a side of the wheel.

12. The bullwheel tensioner system of claim 5, wherein the clamp is configured to transition between a secured configuration and an unsecured configuration to facilitate centering of the reel on the reel shaft,
wherein, when in the secured configuration, the clamp prevents the reel from sliding axially along the reel shaft, and
wherein, when the clamp is in the unsecured configuration, the clamp permits the reel to slide axially along the reel shaft.

13. The bullwheel tensioner system of claim 5, wherein the fairlead assembly comprises:
a fairlead assembly frame;
a first horizontal roller attached to the fairlead assembly frame and disposed proximate a top of the fairlead assembly frame;
a second horizontal roller attached to the fairlead assembly frame and disposed proximate a bottom of the fairlead assembly frame;
a first vertical roller attached to the fairlead assembly frame and disposed proximate a side of the fairlead assembly frame; and
a second vertical roller slidably attached to the fairlead assembly frame, wherein the second vertical roller is adjustable between a first position and a second position.

14. The bullwheel tensioner system of claim 13, wherein the fairlead assembly further comprises:
a slot extending through the fairlead assembly frame; and
an adjustable fastener extending through the slot and the second vertical roller,
wherein the adjustable fastener is configured to prevent the second vertical roller from sliding along a length of the slot when the adjustable fastener is in a secured configuration, and
wherein the adjustable fastener is configured to permit the second vertical roller to slide along the length of the slot between the first position and the second position when the adjustable fastener is in an unsecured configuration.

15. The bullwheel tensioner system of claim 14, wherein, when the second vertical roller is in the first position, the fairlead assembly comprises a first gap formed between the first vertical roller and the second vertical roller, and
wherein, when the second vertical roller is in the second position, the fairlead assembly comprises a second gap formed between the first vertical roller and the second vertical roller, the second gap being greater than the first gap.

16. The bullwheel tensioner system of claim 15, wherein the first gap is approximately 1.8 inches and the second gap is approximately 3.3 inches.

17. A bullwheel tensioner system comprising:
a chassis;
a reel carrier assembly attached to the chassis and configured to support a reel having an electrical utility line disposed thereon;
a fairlead assembly attached to the chassis and configured to receive the electrical utility line, the fairlead assembly comprising:
a fairlead assembly frame;
a first horizontal roller, a second horizontal roller, a first vertical roller, and a second vertical roller each attached to the fairlead assembly frame;
a slot extending through the fairlead assembly frame; and
an adjustable fastener extending through the slot and the second vertical roller, wherein the adjustable fastener is configured to prevent the second vertical roller from sliding along a length of the slot when the adjustable fastener is in a secured configuration and to permit the second vertical roller to slide along the length of the slot between a first position and a second position when the adjustable fastener is in an unsecured configuration; and
a bullwheel assembly, the bullwheel assembly comprising:
a wheel configured to rotate about a central axis extending through a center of the wheel;
a central hub assembly attached to the wheel proximate the center of the wheel, the central hub assembly being configured to permit the wheel to rotate about the central axis;
a shaft in mechanical communication with the central hub assembly and configured to support the central hub assembly;
a bullwheel support frame attached to the chassis and in mechanical communication with the shaft, the bullwheel support frame being configured to support the shaft;
a plurality of removeable liners attached to the wheel and disposed along an outer circumferential surface of the wheel, each removeable liner of the plurality of removeable liners having a groove formed therein, the groove being configured to receive and support a first electrical utility line having an outer diameter of approximately 0.5 inches and a second electrical utility line having an outer diameter of approximately 1.2 inches.

18. The bullwheel tensioner system of claim 17, wherein:
the first horizontal roller is disposed proximate a top of the fairlead assembly frame,
the second horizontal roller is disposed proximate a bottom of the fairlead assembly frame,
the first vertical roller is disposed proximate a first side of the fairlead assembly frame, and
the second vertical roller is disposed proximate a second side of the fairlead assembly frame.

19. The bullwheel tensioner system of claim 17, wherein, when the second vertical roller is in the first position, the fairlead assembly comprises a first gap formed between the first vertical roller and the second vertical roller, and
wherein, when the second vertical roller is in the second position, the fairlead assembly comprises a second gap formed between the first vertical roller and the second vertical roller, the second gap being greater than the first gap.

20. The bullwheel tensioner system of claim 19, wherein the first gap is approximately 1.8 inches and the second gap is approximately 3.3 inches.

* * * * *